(12) United States Patent
Goto

(10) Patent No.: US 7,561,330 B2
(45) Date of Patent: Jul. 14, 2009

(54) REFLECTION TYPE PROJECTING SCREEN, FRONT PROJECTOR SYSTEM, AND MULTI-VISION PROJECTOR SYSTEM

(75) Inventor: Hisashi Goto, Tokyo (JP)

(73) Assignees: Olympus Imaging Corp., Tokyo (JP); Olympus Corporation, Tokyo (JP)

( * ) Notice: Subject to any disclaimer, the term of this patent is extended or adjusted under 35 U.S.C. 154(b) by 553 days.

(21) Appl. No.: 11/274,512

(22) Filed: Nov. 16, 2005

(65) Prior Publication Data

US 2006/0109548 A1 May 25, 2006

(30) Foreign Application Priority Data

Nov. 19, 2004 (JP) .......................... P 2004-336345
Nov. 26, 2004 (JP) .......................... P 2004-343160
Nov. 26, 2004 (JP) .......................... P 2004-343161

(51) Int. Cl.
G03B 21/60 (2006.01)
G03B 21/26 (2006.01)
G02B 5/122 (2006.01)

(52) U.S. Cl. .......................... 359/459; 359/529; 353/79; 353/94

(58) Field of Classification Search .................. 359/459, 359/449, 452, 529; 353/79, 94
See application file for complete search history.

(56) References Cited

U.S. PATENT DOCUMENTS 4,229,085 A * 10/1980 Yamada et al. ................. 353/75
5,837,346 A * 11/1998 Langille et al. ............. 428/141
6,034,717 A * 3/2000 Dentinger et al. ............. 348/51
6,288,803 B1 9/2001 Hattori et al.
6,788,366 B2 9/2004 Sawayama et al.
6,844,969 B2 * 1/2005 Cho et al. .................... 359/459

FOREIGN PATENT DOCUMENTS

| JP | 05-041897 | 2/1993 |
|---|---|---|
| JP | 05-150368 | 6/1993 |
| JP | 05-273651 | 10/1993 |
| JP | 06-148747 | 5/1994 |
| JP | 11-202417 | 7/1999 |
| JP | 11-234784 | 8/1999 |
| JP | 2000-003182 | 1/2000 |
| JP | 2003-195788 | 7/2003 |
| JP | 2003-287818 | 10/2003 |
| JP | 2004-112211 | 4/2004 |

* cited by examiner

Primary Examiner—Christopher Mahoney
(74) Attorney, Agent, or Firm—Kenyon & Kenyon LLP

(57) ABSTRACT

A reflection type projecting screen includes a diffuse plate having a diffuse transmission surface for converting at least transmission light into diffused light and a corner cube array for reflecting the light passing through the diffuse plate to a position which is approximately similar to a passing position of the diffuse transmission surface. The diffuse plate and the corner cube array are positioned in an order of the diffuse plate and the corner cube array. The reflection screen is capable of improving utilization efficiency of light and simplifying the structure while reducing the effect of outside light. Furthermore, there are provided a front projector system and a multi-vision projector system each of which has a projector for projecting the projection light and a reflection screen for reflecting the projection light as diffused light having directivity in at least one predetermined direction, in accordance with the incident direction of the projection light.

16 Claims, 16 Drawing Sheets

REFLECTION TYPE PROJECTING SCREEN, FRONT PROJECTOR SYSTEM, AND MULTI-VISION PROJECTOR SYSTEM

BACKGROUND OF THE INVENTION

1. Field of the Invention

Priority is claimed on Japanese Patent application No. 2004-336345, filed Nov. 19, 2004, No. 2004-343160, filed Nov. 26, 2004, and No. 2004-343161, filed Nov. 26, 2004, the contents of which are incorporated herein by reference.

The present invention relates to a reflection type projecting screen, and more particularly, to a reflection type projecting screen capable of being preferably used in a front projector system or the like which reflects projection light projected from a cine-projector, a projector, or the like which is positioned at a viewing side, in order to view an image. In addition, the present invention relates to a front projector system using a reflection type projecting screen. Furthermore, the present invention relates to a multi-vision projector system, and more particularly, to a multi-vision projector system in which it is possible for a plurality of viewers to appreciate images different from one another, together with sounds which correspond to the respective images.

2. Description of the Related Art

In the case of projecting an image such as a dynamic image, a static image, or the like on a screen by a projector such as a cine-projector, a projector, or the like, in order to appreciate the image in a conventional reflection type projecting screen, there is a problem in which contrast becomes poor in the image produced by the projection light, inasmuch as outside light is reflected on the screen in a bright room. In order to solve the above-mentioned problem, a proposal has been made as regards a reflection type projecting screen having improved reflection properties.

More specifically, a description is made in Japanese Patent Application Unexamined Publication No. 1994-148747 (Pages 2 to 3) about a projecting screen having a metal thin layer and a mat layer with an organic spherical filler. The projecting screen has reflection brightness with respect to white light that is not less than 10% and has a half-value angle with respect to the reflection brightness that is not less than 30 degrees.

A description is made in Japanese Patent Application Unexamined Publication No. 2003-287818 (Pages 5 to 16, FIGS. 1, 6, and 7) about a reflection type screen having a bead diffusion layer, a cholesteric liquid crystal (CLC) layer, and a shielding layer in that order from a light source (projector). Furthermore, a description is made in Japanese Patent Application Unexamined Publication No. 2003-287818 about a reflection type screen having a CLC layer, a substrate forming concavity and convexity in which the CLC layer forms a diffuse reflection layer, and a shielding layer in that order from a light source. In addition, a description is made in Japanese Patent Application Unexamined Publication No. 2003-287818 about a reflection type screen having a CLC layer, a substrate forming concavity and convexity in which the CLC layer forms a corner cube structure, and a shielding layer in that order from a light source.

In addition, a description is made in Japanese Patent Application Unexamined Publication No. 2003-195788 (Pages 5 to 10, FIGS. 1 and 15) about a display device having a corner cube array comprising a color filter, a diffuse type liquid crystal layer capable of switching between reflection and diffusion, and a corner cube reflector in that order from a light source. The corner cube array realizes only retro-reflection by making the diffuse type liquid crystal layer switch between reflection and diffusion and selectively realizes a state of cutting off light emitted from the light source and a state of diffusively reflecting light emitted from the light source.

Furthermore, a description is made in Japanese Patent Application Unexamined Publication No. 1993-150368 (Pages 2 to 4, FIGS. 1 to 5) about a reflection type screen having a retro-reflection property that comprises a corner cube mirror having two reflection surfaces each of which is formed into a concave surface. The reflection type screen diffuses the light reflected by each of the concave surfaces and has a reflecting directivity in which the light width is narrow in a vertical direction and is wide in a horizontal direction.

However, the above-mentioned conventional reflection type screens have the following problems.

In the art described in Japanese Patent Application Unexamined Publication No. 1994-148747, it is not stated that utilization efficiency of light is not sufficiently improved, although the reflection brightness is not less than 10% and is slightly improved in comparison to the prior art. As a result, there is a problem in which it is necessary to have a light source having high power.

In the art described in Japanese Patent Application Unexamined Publication No. 2003-287818, it is necessary to control the layer thickness and the orientation of the CLC layer over the screen, although it is possible to improve the utilization efficiency of light by using the CLC layer. Therefore, there is a problem in which the screen becomes expensive to produce. As result, it is difficult to easily apply the art described in Japanese Patent Application Unexamined Publication No. 2003-287818 to a large-scale projecting screen.

In the art described in Japanese Patent Application Unexamined Publication No. 2003-195788, a description is made about the display device capable of switching between retro-reflection and diffuse reflection by using the corner cube reflector and the diffuse type liquid crystal layer. In the case of being employed in the reflection type projecting screen, there is a possibility that the utilization efficiency of light can be improved. However, there is a problem in which the reflection type projecting screen becomes very expensive to produce, inasmuch as the diffuse type liquid crystal layer is located on the back surface of the corner cube reflector and it is necessary to electrically control the diffuse type liquid crystal layer.

Although it is possible to reflect the light having a comparative high directivity with respect to an incident direction by forming the concave surface on the corner cube mirror in the art described in Japanese Patent Application Unexamined Publication No. 1993-150368, the reflection type screen becomes very expensive to produce inasmuch as it is necessary to form a correct concave shape on the corner cube mirror at great expense in both time and effort.

In addition, there is a problem in which it is impossible to obtain high image quality inasmuch as the image becomes irregular, in the case where an error becomes large with respect to the formation of the concave surface.

Taking the above-mentioned problems into consideration, it is an object of the present invention to provide a reflection type projecting screen having a simple structure that is capable of reducing the effect of outside light and improving the utilization efficiency of light.

With respect to the front projector system, a proposal is made about a projecting screen capable of improving a reflection property in order to solve the problem in which the contrast becomes poor in the image produced on the basis of the projection light because the outside light is reflected on the screen in a bright room.

More specifically, a description is made in Japanese Patent Application Unexamined Publication No. 1993-273651

(Pages 2 to 3, FIGS. 1 and 2) about a projecting reflection type screen having a plurality of beads each of which has an approximate spherical shape and whose refractive indexes are different from one another. The beads are positioned on a screen substrate forming a reflective layer on its hemispherical surface opposite to the light source.

In addition, a description is made in Japanese Patent Application Unexamined Publication No. 1999-202417 (Pages 2 to 6, FIG. 1) about a hologram screen having a hologram element and a light diffuse element. The hologram element has a function of diffracting the projection light which is projected from the projector. The light diffuse element has a diffuse angle which is not less than 5 degrees.

In general, it is known that one projector projects an image on one screen in a conventional projector system, and a plurality of viewers are positioned within a predetermined angle range with respect to the projecting direction, in order to appreciate the image projected on the screen. Furthermore, a multi-vision system is known in which a plurality of projectors project images on one screen while changing the projecting regions of each of the images. It is possible for each viewer to appreciate each image in the multi-vision system.

However, the above-mentioned conventional projector systems have the following problems.

In the case where one projector projects the image on one screen, there is a problem in which equipment such as a screen and a projection room becomes large and the utilization efficiency becomes poor, because the entire screen is occupied even if there are not many viewers.

Although it is possible to improve the efficiency with respect to the equipment because a plurality of images are projected on one screen in the multi-vision system, there is a problem in which other images obstruct viewing, in the case of projecting unrelated images. In addition, it is problematic to project images of a confidential or delicate nature such as explanatory materials used in a conference, because the viewers positioned before the screen can view all of the images.

On the other hand, a projector system has not been known which shares one screen between the images by projecting the images on a common region of one screen, in order to appreciate images different from one another, in a plurality of viewing groups.

More particularly, the art described in Japanese Patent Application Unexamined Publication No. 1993-273651 makes the refractive index vary in each bead, in order to change the directivity of reflection light, in the case of constructing such a projector system. As a result, it is difficult to freely change the directivity of reflection light and it is difficult to strictly control the reflected direction and diffuse range in accordance with the incident angle of the image. In addition, there is a problem in which the diffuse range becomes wide and the reflectivity is reduced on the basis of diffusion between the beads. As a result, there is a problem in which it is difficult to strictly divide the image into a plurality of image components and degradation occurs in the image quality, in the case of inputting a plurality of images.

Although it is possible to output light having directivity with respect to a specific direction when the light is inputted from a specific incident direction, because the art described in Japanese Patent Application Unexamined Publication No. 1999-202417 uses diffractive light obtained by a hologram element, and it is necessary to have a high power light source because the utilization efficiency of light is poor. Furthermore, there is a problem in which flare light easily occurs. In addition, there is problem in which it is difficult to make the layout of the projectors and the screen in agreement with locations, inasmuch as the input and the output directions are limited to directions which are strictly determined on manufacturing the hologram element. In addition, it is difficult to manufacture a large-scale screen because of using the hologram element.

Taking the above-mentioned problems into consideration, it is an object of the present invention to provide a front projector system capable of projecting an image in a specific region based on an incident direction without being obstructed by outside light and other images, by projecting the images on one screen while changing the incident direction. It is another object of the present invention to provide a front projector system capable of effectively using one screen in the case of projecting a plurality of images and capable of easily establishing a viewing region with respect to the screen.

In a projector system which projects an image such as a dynamic image, a static image, or the like on a screen by a projector such as a cine-projector, a projector, or the like, on viewing the image, it is known that one projector projects an image on one screen, and a plurality of viewers are positioned within a predetermined angle range with respect to the projecting direction, in order to view the image projected on the screen. Furthermore, a multi-vision projector system is known in which a plurality of projectors project images on the projecting regions which are defined on one screen, in order to view the images.

More specifically, a description is made in Japanese Patent Application Unexamined Publication No. 2000-3182 (Pages 3 to 5, FIGS. 1, 2, and 4) about a projector system which forms an internal space of an attraction hall that is for projecting a three-dimensional image on the screen and a projector system which provides a visual effect such as the same image to viewers each sitting on a chair. Furthermore, a description is made in Japanese Patent Application Unexamined Publication No. 2000-3182 (Pages 3 to 5, FIGS. 1, 2, and 4) about a sound system capable of playing sounds which are different from one another in synchronization with the images.

However, the above-mentioned conventional projector system has the following problem.

In the case where one projector projects the image on one screen, there is a problem in which equipment such as a screen and a projection room becomes large and the utilization efficiency becomes poor, because the entire screen is occupied even if there are not many viewers.

Although it is possible to improve the utilization efficiency with respect to the equipment because a plurality of images are projected on one screen in the multi-vision system, there is a problem in which other images obstruct viewing, in the case of projecting unrelated images.

Although it is possible to expect an effect in which it is easy to selectively view the image corresponding to the sound because it is possible for each viewer to listen to a different sound, in the case of applying the art described in Japanese Patent Application Unexamined Publication No. 2000-3182 to the multi-vision system, there is a problem in which the view is visually obstructed because other images come into view. For example, it is problematic to project images of a confidential or delicate nature such as explanatory materials used in a conference, because the viewers positioned before the screen can view all of the images.

On the other hand, a projector system has not been known which shares one screen between the images by projecting the images on a common region of one screen, in order to appreciate images different from one another, in a plurality of viewing groups.

Taking the above-mentioned problems into consideration, it is an object of the present invention to provide a multi-vision projector system capable of displaying an image and playing a sound related to the image in each viewing region without being obstructed by images and other sounds even if a plurality of images are projected on a screen, in order to effectively use the screen and to independently display the image and playing the sound in each viewing region.

SUMMARY OF THE INVENTION

In order to solve the above-mentioned problems, there is provided a reflection type projecting screen for reflecting projection light from a light source. According to a first aspect of the present invention, the reflection type projecting screen comprises a diffuse transmission surface for converting at least transmission light into diffused light and a corner cube group positioned at a back surface side of the diffuse transmission surface when looking from the light source. The corner cube group reflects the projection light passing through the diffused transmission light towards the diffuse transmission surface.

According to the reflection type projecting screen, the light passing through the diffuse transmission surface becomes diffused light which is inputted to the corner cube group, when imaging the projection light on the diffuse transmission surface. Inasmuch as the corner cube group is a retro-reflecting element, the diffused light is reflected towards a direction of 180° with respect to the direction in which the diffused light enters the corner cube group, and the diffused light is again inputted to approximately the same position of the diffuse transmission surface. When the transmission light passes through the diffuse transmission surface, the transmission light is again diffused to be outputted to a light source side. Accordingly, it is possible to view an image based on the projection light within a range in which the diffused light spreads.

On the other hand, the outside light, which is inputted from a direction different from a direction of the light source, is approximately retro-reflected towards the incident direction. As a result, the viewing is not obstructed inasmuch as the image based on the projection light is not mixed with the outside light.

In addition, it is possible to form diffused light which spreads over a comparatively wide range even if the magnitude of diffusion is small once in the diffuse transmission surface, inasmuch as the transmission light passes through the diffused transmission light twice. Therefore, it is possible to reduce the loss of light quantity in a diffusive process and to easily form diffused light having strong directivity.

For example, the corner cube group has a number of corner cubes which are arranged without a gap or with a slight gap.

Preferably, the above-mentioned reflection type projecting screen satisfies the following Formulas when inputting light of wavelengths $\lambda_B$=485 nm, $\lambda_G$=550 nm, and $\lambda_R$=650 nm.

$$0.8 \leq (R_B/I_B)/(R_G/I_G) \leq 1.25 \quad (1)$$

$$0.8 \leq (R_R/I_R)/(R_G/I_G) \leq 1.25 \quad (2)$$

where $I_B$, $I_G$, and $I_R$ represent the incident light intensities of wavelengths of $\lambda_B$, $\lambda_G$, and $\lambda_R$, respectively, and $R_B$, $R_G$, and $R_R$ represent the output light intensities of wavelengths of $\lambda_B$, $\lambda_G$, and $\lambda_R$, respectively.

According to the reflection type projecting screen, each of the reflection coefficients representing blue and red is established to a range near 1, inasmuch as $\lambda_B$, $\lambda_G$, and $\lambda_R$ are selected as the wavelengths representing the three primary colors of blue, green, and red and inasmuch as the ratios (reflection coefficients) of output intensities with respect to the input intensities are established so as to satisfy Formulas (1) and (2). Accordingly, it is possible to obtain a reflection type projecting screen having high color reproducibility, inasmuch as the balance between reflection coefficients representing blue, green, and red becomes good in the projection light.

Although Formulas (1) and (2) hold true for each of optional incident angles, it is better that Formulas (1) and (2) hold true for the range of incident angles which are actually used. More particularly, it is sufficient that Formulas (1) and (2) hold true for the incident angle of 45° with the normal line of a diffuse transmission surface. Furthermore, Formulas (1) and (2) hold true for the incident angle of 30° or 20° with the normal line of a diffuse transmission surface.

Incidentally, it is preferable to make the ranges given by Formulas (1) and (2) narrow. More specifically, it is preferable to establish ranges given by the following Formulas.

$$0.9 \leq (R_B/I_B)/(R_G/I_G) \leq 1.15 \quad (1a)$$

$$0.9 \leq (R_R/I_R)/(R_G/I_G) \leq 1.15 \quad (2a)$$

Preferably, the following Formulas are satisfied in the above-mentioned reflection type projecting screen when inputting light of wavelengths $\lambda_B$=485 nm, $\lambda_G$=550 nm, and $\lambda_R$=650 nm, to said diffuse transmission surface.

$$0.5 \leq R_B/I_B \leq 1 \quad (3)$$

$$0.5 \leq R_G/I_G \leq 1 \quad (4)$$

$$0.5 \leq R_R/I_R \leq 1 \quad (5)$$

where $I_B$, $I_G$, and $I_R$ represent the incident light intensities of wavelengths of $\lambda_B$, $\lambda_G$, and $\lambda_R$, respectively, and $R_B$, $R_G$, and $R_R$ represent the output light intensities of wavelengths of $\lambda_B$, $\lambda_G$, and $\lambda_R$, respectively.

According to the reflection type projecting screen, it is possible to obtain a bright image, inasmuch as $\lambda_B$, $\lambda_G$, and $\lambda_R$ are selected as the wavelengths representing blue, green, and red and inasmuch as Formulas (3) to (5) are satisfied in the output intensities with respect to the input intensities.

Although Formulas (3) to (5) hold true for each of optional incident angles, it is better that Formulas (3) to (5) hold true for the range of incident angles which are actually used. More particularly, it is sufficient that Formulas (3) to (5) hold true for the incident angle of 45° with the normal line of a diffuse transmission surface. Furthermore, Formulas (3) to (5) hold true for the incident angle of 30° or 20° with the normal line of a diffuse transmission surface.

Preferably, the corner cube group is composed of a prism group in the above-mentioned reflection type projecting screen.

According to the reflection type projecting screen, it is possible to easily form a reflection surface, inasmuch as the reflection surface of the corner cube becomes an inner reflection surface. In addition, it is possible to use the reflection surface as a total reflection surface according to usage conditions. In this case, it is possible to obtain a good reflection coefficient without forming a mirror coat on the reflection surface. Accordingly, it is possible to improve the utilization efficiency of light and to easily manufacture the reflection type projecting screen.

Preferably, the incident surface of the prism group serves as the diffuse transmission surface in the above-mentioned reflection type projecting screen.

According to the reflection type projecting screen, it is possible to reduce the number of parts, inasmuch as the incident surface of the prism group serves as the diffuse transmission surface. In addition, it is possible to reduce the loss of light quantity, inasmuch as an optical surface does not exist between the diffuse transmission surface and the inner reflection surface of the prism group.

Preferably, the above-mentioned reflection type projecting screen comprises a light diffuse transmission element whose one surface has the diffuse transmission surface and whose opposite surface has a smooth flat plane surface or a smooth curved surface. The opposite surface of the diffuse element is directed towards the light source.

According to the reflection type projecting screen, the diffuse transmission surface is not exposed to the side of the light source, inasmuch as the one surface has the diffuse transmission surface and the another surface has a smooth flat plane surface or a smooth curved surface in the light diffuse transmission element and the another surface of the diffuse element is directed towards the light source. Accordingly, it is possible to prevent the diffuse transmission surface from becoming dusty and dirty.

In addition, it is possible to clean the diffuse transmission surface by wiping the dust and dirt even if the dust and dirt are adhered on the smooth flat plane surface or the smooth curved surface which is exposed to the side of light source. Accordingly, it is possible to obtain a structure having a resistance against dust and dirt even if the diffuse transmission surface is a fine concave and convex surface which is capable of easily being manufactured.

It is sufficient that the smooth flat plane surface or the smooth curved surface has a smoothness in which the surface is resistant to adherence of dirt and it is possible to easily clean the surface, even if the dirt is adhered on the surface.

In addition, it is preferable to form an antistatic coating on the smooth flat plane surface or the smooth curved surface, in order to make the surface more resistant to dirt.

Preferably, the corner cube group is formed by joining a plurality of corner cube units to one another in the above-mentioned reflection type projecting screen. The corner cube units are composed of one corner cube or a plurality of corner cubes which are integral with one another.

According to the reflection type projecting screen, it is possible to easily manufacture a large screen when joining the corner cube units each of which has a small size and is capable of easily being manufactured, inasmuch as the corner cube group is formed by joining the corner cube units to one another One corner cube is a member having three reflection surfaces that function as the corner cube.

In this case, it is preferable to form concave and convex shapes for use in joining the corner cube units to one another in joining portions, in each of the corner cube units, in order to facilitate convenience of assembly and positioning. More particularly, it is preferable that the corner cube unit has a divided shape in which the corner cubes are fitted to one another.

Preferably, a light shielding treatment is applied to ridge line portions in which the corner cubes of the corner cube group are adjacent to one another in the above-mentioned reflection type projecting screen.

According to the above-mentioned reflection type projecting screen, it is possible to prevent the scattering of light in each of the ridge line portions, inasmuch as the light shielding treatment is applied to the ridge line portions in which the corner cubes are adjacent to one another. As a result, it is possible to prevent the degradation of image quality based on the scattered light. Although total length is long in the ridge line portions subjected to the light shielding treatment, the loss of light quantity is little inasmuch as the area subjected to the light shielding treatment is small.

Preferably, a pitch of a concave and convex surface is smaller than a pitch between vertexes of the corner cubes in the corner cube group, when the diffuse transmission surface is the concave and convex surface, in the above-mentioned reflection type projecting screen.

According to the reflection type projecting screen, a plurality of concave and convex surfaces are positioned with respect to one corner cube, inasmuch as the pitch of the concave and convex surface is smaller than the pitch between vertexes of the corner cubes. Accordingly, it is possible to obtain a reflection type projecting screen having a high image quality, inasmuch as it is possible to restrict the degradation of resolution.

Incidentally, it is preferable that the pitch of the concave and convex surface is smaller than ⅓ of the pitch between vertexes of the corner cubes, in order to further obtain a high image quality.

The reflection type projecting screen of the present invention comprises a comparatively simple structure such as the corner cube group and the diffuse transmission surface. According to the reflection type projecting screen, it possible to remove the effect of outside light which enters in a direction different from the direction of the light source, by retro-reflection of corner cube group. Inasmuch as the diffused light passing through the diffuse transmission surface is reflected to the approximate same position by the corner cube group and is outputted to the side of the light source, there is an effect in which it is possible to improve the utilization efficiency of light.

According to a second aspect of the present invention, there is provided a front projector system comprising a projector for projecting an image and a reflection screen which reflects the image as diffused light having directivity in at least one predetermined direction, in accordance with an incident direction of the image.

According to the front projector system, the image is reflected as diffused light having directivity in at least one predetermined direction, in accordance with the incident direction of the image, when the image is projected in a predetermined incident direction by the projector. Therefore, it is possible to view the image projected on the reflection screen, in at least one predetermined viewing region without being obstructed by the outside light and other images.

Preferably, the incident direction of the image with respect to the reflection screen is included in a range of reflection directions of the diffused light, in the above-mentioned front projector system.

According to the front projector system, it is possible to establish a region along the projecting direction of the projector, as the viewing region, inasmuch as the incident direction of the image is included in the range of reflection directions of the diffused light. Accordingly, it is possible to easily make a layout in the case of forming the viewing regions different from one another in the images which enter in directions different from one another. In addition, it is possible to make a layout in which the viewers in each viewing region are capable of easily operating the projector.

Preferably, an angle range corresponding to the predetermined direction is not greater than 30° when the directivity is given by the angle range in which the diffused light is distributed, in the above-mentioned front projector system.

According to the front projector system, it is possible to obtain good directivity, inasmuch as the diffused light is reflected in the angle range which is not greater than 30° with respect to the predetermined direction.

More specifically, it is possible to form a plurality of viewing regions without interference of the viewing regions corresponding to the images whose reflection directions are different from one another. In the case where the reflection screen is composed of a retro-reflecting plate, it is possible to form at least three independent viewing regions, in an angle range of 180° in front of the screen.

The angle range of the diffused light may be defined as an angle range which is not less than 0.2% with respect to a peak value $I_{max}$ of the light intensity distribution of diffused light. Alternatively, the angle range of the diffused light may be defined as an angle range which is not less than 0.4% with respect to an average value $I_{ave}$ of the light intensity distribution.

Incidentally, it is preferable to make the angle range with respect to the predetermined direction narrow in the directivity of diffused light, in order to increase the number of viewing regions.

More particularly, it is preferable that the angle range is not greater than 25°. It is further preferable that the angle range is not greater than 20° or 10°.

Preferably, the predetermined direction is a direction which forms approximately 180° with respect to the incident direction in which the image enters the reflection screen, in the above-mentioned front projector system.

It is possible for the front projector system to have a simple structure which is obtained by combining the retro-reflecting plate and the diffuse plate, inasmuch as the predetermined direction, which is a center of directivity of the reflected diffused light, forms an approximate 180° with respect to the incident direction of the image that enters the reflection screen, in the above-mentioned front projector system.

As a result, it is possible to form the viewing regions along the projecting direction of the projector. Therefore, it is possible to make a layout in which each of the viewers is capable of easily operating the projector in the viewing region.

Preferably, the front projector system comprises a plurality of projectors. The images projected from the projectors are projected on the reflection screen from directions different from one another with respect to the reflection screen.

According to the front projector system, it is possible to independently view the reflected images in the viewing regions, inasmuch as the images are projected from the projectors on one reflection screen in directions which are different from one another.

Preferably, at least part of the images projected from the projectors are projected on a common region of the reflection screen, in the above-mentioned front projector system.

According to the front projector system, it is possible to use a common region in relation to the viewing regions, inasmuch as at least part of each image is projected on the common region of the reflection screen. As a result, it is possible to project the images on the reflection screen, even if the reflection screen has a comparatively small area.

Preferably, a following Formula is satisfied when the projector is located at a position which is apart by a distance d from the reflection screen, in the above-mentioned front projector system.

$$d \geq 0.5 \times L/\tan 25° \quad (9)$$

where L represents a diagonal length in the image which is projected from the projector to the reflection screen.

According to the front projector, it is possible to project the image adjacent to the projectors even if a half angle of view of 25° is used as an angle of view, inasmuch as the distance d satisfies the Formula (9). Furthermore, it is possible to make a layout in relation to the viewing regions so as to independently view the images projected by the projectors. In other words, it is possible to form the viewing regions in which crosstalk occurs, even if panoramic images are projected on the reflection screen.

Incidentally, it is preferable to enlarge the distance d, in order that the crosstalk occurs when the distance between the adjacent projectors is narrow or the front projector system has a number of projectors. More particularly, it is preferable to satisfy the following Formula (9a).

$$d \geq 0.5 \times L/\tan 20° \quad (9a)$$

Preferably, the projector is located at an upper side or a lower side with respect to a front region of the reflection screen, in the above-mentioned front projector system.

According to the front projector system, it is possible to easily form the viewing regions in front of the reflection screen, inasmuch as the projector is located at the upper side or the lower side with respect to a front region of the reflection screen. As a result, it is possible to improve the flexibility of the layout in a horizontal direction. More specifically, it is possible to make a layout so as to overlap the viewing regions with the projector up and down.

Preferably, the reflection screen has a corner cube array in the above-mentioned front projector system.

According to the front projector system, it is possible to make the predetermined direction of the reflected light be approximately 180° with respect to the incident direction, using the retro-reflecting property of the corner cube array. Accordingly, it is possible to form the viewing regions in a direction along the projecting direction of the projector.

In addition, it is possible to make the front projector system cheap, inasmuch as it is possible to manufacture the corner cube array using an integrally molded synthetic resin.

According to the front projector system of the present invention, it is possible to effectively use one reflection screen when the images are projected on the reflection screen while changing the incident directions of the images, inasmuch as it is possible to view the image projected on the screen, on at least one predetermined screen without being obstructed by the outside light and other images. Furthermore, it is possible to easily form the viewing regions at appropriate positions with respect to the reflection screen when appropriately changing the incident directions.

According to a third aspect of the present invention, there is provided a multi-vision projector system comprising a plurality of projectors for projecting images from directions different from one another, a screen on which a plurality of images projected by the projectors are projected as diffused light which has directivities in predetermined directions, in accordance with incident directions of the images, a plurality of viewing regions in which the images projected from the screen are individually displayed without the images overlapping, and a speaker for individually outputting sounds corresponding to the images which are individually displayed in the viewing regions towards the viewing regions.

According to the multi-vision projector system, it is possible to project the images which are projected by the projectors in directions different from one another, in the ranges of diffused light by using the reflection screen which is capable of projecting the incident images as diffused light each of which has directivity, in the incident directions. Accordingly, it is possible to form the viewing region in which a specific one of the images is capable of being viewed, in each of the predetermined directions, when using one reflection screen and projecting the images in the predetermined directions. It is possible for the viewer to view the image and listen to the sound in the viewing region without being obstructed by the other images and the other sounds, inasmuch as the sounds are outputted from the speaker in correspondence to the images which are capable of being viewed in the viewing regions.

Preferably, the speaker is positioned near the screen and outputs sound which has directivity towards directions of the viewing regions, in the above-mentioned multi-vision projector system.

According to the multi-vision projector system, it is possible to reliably output only the sound corresponding to the image to each of the viewing regions, inasmuch as the speaker is positioned near the reflection screen and outputs sounds each of which has directivity, towards directions of the viewing regions. In addition, it is possible for the viewer to view the image while listening to the sound, inasmuch as the sound is outputted from a direction in which the image is capable of being seen.

Preferably, the above-mentioned multi-vision projector system comprises a plurality of speakers. At least one speaker is located in or near each of the viewing regions. The speaker has directivity within a range of the corresponding viewing region.

According to the multi-vision projector system, it is possible to reliably output sound corresponding to the image which is being viewed in the viewing region, inasmuch as at least one speaker having directivity within a range of the corresponding viewing region is located in or near each of the viewing regions. In addition, it is easy to prevent the sound from leakage to the other viewing regions even if each of the speakers is a simple structure, inasmuch as it is possible to establish each of the magnitude of directivity and volume to a comparatively small value.

Preferably, the speaker comprises a sound outputting speaker section for outputting sound towards each of the viewing regions and a sound dampening speaker section for outputting sound which has a phase inverse to a phase of the sound corresponding to an adjacent viewing region, to dampen the sound leaking from the adjacent viewing region which is adjacent to each of the viewing regions, in the above-mentioned multi-vision projector system.

According to the multi-vision projector system, the sound leaking from the adjacent viewing region is dampened by the sound outputted from the sound dampening speaker section in each of the viewing regions, inasmuch as the speaker comprises the sound outputting speaker section for outputting sound towards each of the viewing regions and the sound dampening speaker section for outputting sound which has the phase inverse to the phase of the sound corresponding to the adjacent viewing region. As a result, it is possible to reliably listen to the sound outputted from the sound outputting speaker section, without being obstructed by the sound corresponding to the adjacent viewing region.

Preferably, each of the viewing regions is formed in a soundproofing booth having an opening in a direction which is directed towards said screen in the above-mentioned multi-vision projector system. The soundproofing booth is shielded except for the opening.

According to the multi-vision projector system, it is possible to shield the sound which is received in the direction except at the opening, inasmuch as the viewing region is formed in the soundproofing booth. As a result, it is easy to listen to the sound outputted from the sound outputting speaker section.

Preferably, the images projected by the projectors are projected from a rear side of the screen when looking from the viewing regions, in the above-mentioned multi-vision projector system.

According to the multi-vision projector system, it is easy to make a layout inasmuch as the multi-vision projector system becomes a rear projector system and the projectors are reliably separated from the viewing regions.

Preferably, the screen is composed of a transparent type screen through which incident light passes with diffusion in the above-mentioned multi-vision projector system. The transparent type screen diffuses the incident light within a range which is not greater than 45° in a horizontal direction.

According to the multi-vision projector system, it is easy to form a plurality of viewing regions in the horizontal direction, inasmuch as the transparent type screen diffuses the incident light within the angle range which is not greater than 45° in the horizontal direction. When the angle range is greater than 45°, the images, which are positioned at a peripheral portion and which have large angles of view, are overlapped on one another, although it is possible to separate the images traveling on the optical axes. As a result, crosstalk easily occurs and it is difficult to form a plurality of viewing regions.

Preferably, the images projected by the projectors are projected from a front side of the screen when looking from said viewing regions, in the above-mentioned multi-vision projector system.

According to the multi-vision projector system, it is easy to adjust the relationship between the projectors and to operate each of the projectors, inasmuch as the multi-vision projector system becomes the front projector system and it is possible to approximate the projectors to the viewing regions. In addition, it is possible to use a booth as a supporting member for the projector, in the case of forming the viewing region in the booth.

Preferably, the screen is composed of a reflection type screen in which incident light is reflected with diffusion, in the above-mentioned multi-vision projector system. The reflection type screen diffuses the incident light within a range which is not greater than 45° in a horizontal direction.

According to the multi-vision projector system, it is easy to form a plurality of viewing regions in the horizontal direction, inasmuch as the reflection type screen diffuses the incident light within the angle range which is not greater than 45° in the horizontal direction. When the angle range is greater than 45°, the images, which are positioned at a peripheral portion and which have large angles of view, are overlapped on one another, although it is possible to separate the images traveling on the optical axes. As a result, crosstalk easily occurs and it is difficult to form a plurality of viewing regions.

According to the multi-vision projector system of the present invention, it is possible to form the viewing region in which a specific one of the images is capable of being viewed in each of the predetermined directions when the images, which are projected by the projectors in directions different from one another, are projected towards the centers of predetermined directions based on the incident directions. Inasmuch as the sounds corresponding to the images are outputted to the viewing regions by the speakers, it is possible for the viewer to view the image and the sound in the viewing region without being obstructed by the other images and the other sounds. As a result, it is possible to simultaneously view the image and listen to the sound in each of the independent viewing regions while effectively using the screen.

DETAILED DESCRIPTION OF THE INVENTION

Figure 1A:
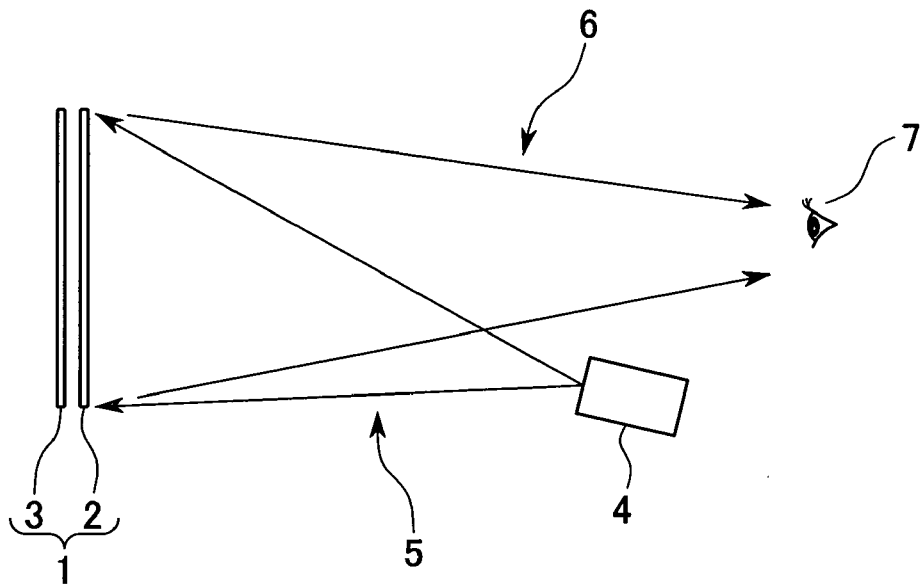
FIGS. 1A and 1B respectively show a schematic side view and a partially enlarged view each of which is for describing an outline structure of a projector system using a reflection type projecting screen according to an embodiment of the present invention.

A description will be made as regards embodiments of the present invention with reference to the attached drawings. Similar or corresponding members will be designated by like reference numerals and common descriptions will be omitted even though the embodiments are different from one another.

Reflection Type Projecting Screen

A description will proceed of a reflection type projecting screen according to an embodiment of the present invention.

Figure 1B:
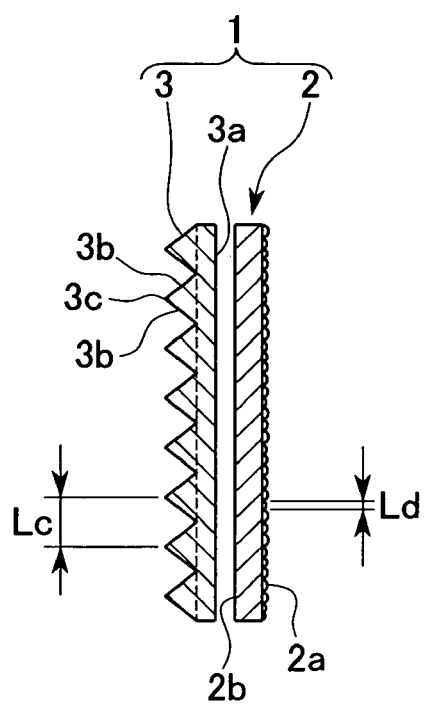
Figure 2A:
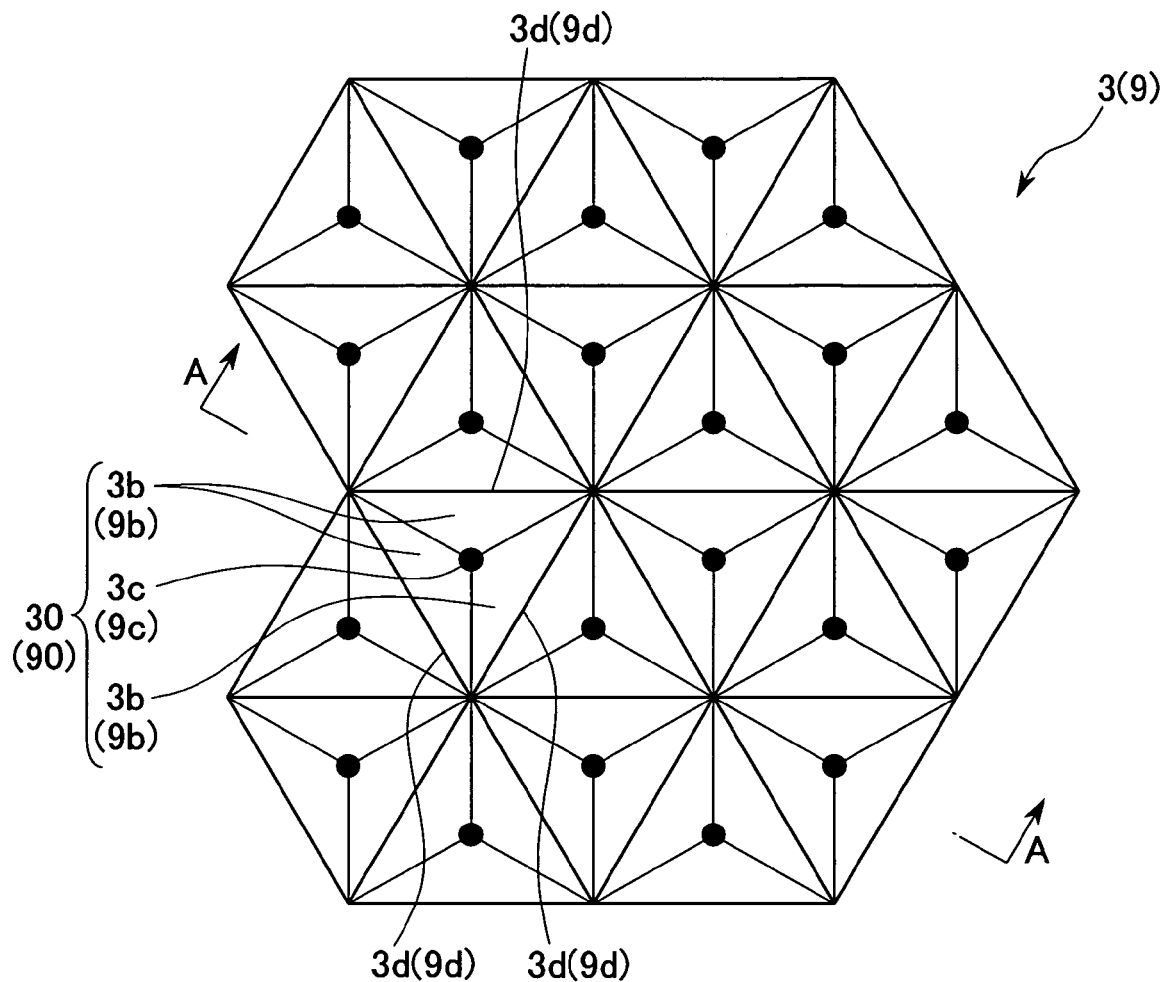
FIGS. 2A and 2B respectively show a schematic plane view and a sectional view along A-A line in FIG. 2A each of which is for describing an outline structure of a corner cube group according to an embodiment of the present invention.
Figure 2B:
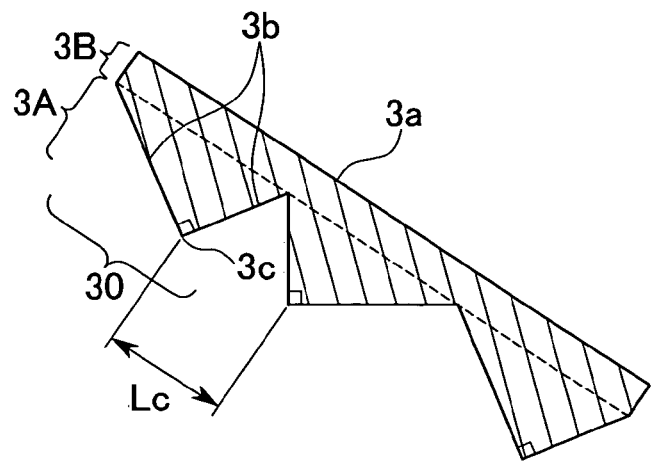

FIG. 1A shows a schematic side view for describing an outline structure of a projector system using a reflection type projecting screen according to an embodiment of the present invention. FIG. 1B shows a partially enlarged view for describing a structure of the reflection type projecting screen according to the embodiment of the present invention. FIGS. 2A and 2B respectively show a schematic plane view and a sectional view along A-A line in FIG. 2A each of which is for describing an outline structure of a corner cube group according to an embodiment of the present invention. Incidentally, all ridge lines are represented by solid lines in FIG. 2A, inasmuch as FIG. 2A shows a plane location with respect to a corner cube group of a reflector type which will be described hereinafter. In addition, a black circle represents a vertex of a concave portion.

As shown in FIG. 1A, a reflection screen (reflection type projecting screen) 1 according to the present embodiment is preferably used as a projecting screen in a front projector system in which a projector (light source) 4 projects an image as projection light 5 on the reflection screen 1 and reflects the image as screen reflected light 6 to the side of a light source, so that viewers can view the image.

In an outline structure, the reflection screen 1 comprises a diffuse plate (diffuse element) 2 and a corner cube array (corner cube group) 3. The diffuse plate 2 and the corner cube array 3 are located in order of the diffuse plate 2 and the corner cube array 3 from a light source side (right side of the drawing) and are separated by a regular interval.

As shown in FIG. 1B, the diffuse plate 2 is shaped into an approximate rectangular plate member. The diffuse plate 2 has a diffuse transmission surface 2a which is formed on a light source side and which is for diffusing incident light and allowing the incident light to pass therethrough. Furthermore, the diffuse plate 2 has a transmission surface 2b which faces the corner cube array 3 and which is on the opposite side to the light source. Transmitted light is outputted from the transmission surface 2b. The diffuse plate 2 may be, for example, a flat plate. Alternatively, the diffusive surface 2 may be, for example, a plate which is slightly bent, in order to easily view the image.

It is possible to use a synthetic resin, glass, or the like as a material of the diffuse plate 2.

The diffuse transmission surface 2a has optical permeability. Although any formation may be used as long as it is possible to diffuse the transmitted light, it is possible to form the diffuse transmission surface 2a by forming fine concavities and convexities on the surface of a transmission plate to constitute the diffuse plate 2, using, for example, a mat relief processing.

In addition, a diffuse transmission sheet, which is shaped into a thin layer sheet, may be pasted on the transmission plate.

Furthermore, optically transparent minute powders, which are different in refractive index from the substrate material, may be formed on the surface of the transmission plate. Alternatively, the optical transparent minute powders may be diffused in the transmission plate. Although the diffuse transmission surface is not strictly formed in the latter case, it is possible to assume that the diffuse transmission surface is approximately formed in a central portion of the plate in the case where the diffuse plate 2 has a thin thickness.

Preferably, the transmission surface 2b has a high transmittance in order to improve the utilization efficiency of light. According to need, a reflection preventing coat may be formed on the transmission surface 2b.

As shown in FIGS. 2A and 2B, the corner cube array 3 is shaped into a plate shaped member having a plurality of corner cube prisms 30. Each of the corner cube prisms 30 has three reflection surfaces which are orthogonal to one another. Furthermore, a flat plate portion 3B is formed on a bottom surface side of a triangular pyramid section 3A whose bottom surface is shaped into an equilateral triangle, in each of the corner cube prisms 30. In addition, adjacent ridge line portions 3d each of which is a ridge line of a bottom surface of the triangular pyramid section 3A are adjacent to one another in the corner cube array 3. The corner cube array 3 has a size which is approximately equal to that of the diffuse plate 2 in a plane view.

An incident surface 3a, which is approximately parallel to the transmission surface 2b of the diffuse plate 2, is formed on the flat plate portion 3B in a side of the diffuse plate 2.

For the above-mentioned location, a pitch $L_c$ is given by Formula (6) when the pitch $L_c$ represents the shortest distance between vertexes 3c of the corner cube prisms 30 which are adjacent to each other and when $L_T$ represents a length of an adjacent ridge line 3d.

$$L_c = 2 \times L_T / \sqrt{3} \tag{6}$$

The pitch Lc is a diameter of an inscribed circle in the bottom surface of the triangular pyramid section 3A and is substantially representative of the size in each of the corner cube prisms 30.

It is possible to establish the size of the pitch $L_c$ in accordance with a necessary resolution. More particularly, it is necessary to satisfy Formula (7) in the case of establishing a resolution on resolving a pattern in which a black line of width W and a white line of width W alternate on the reflection screen 1.

$$L_c < W \tag{7}$$

Even though Formula (7) is satisfied, the resolution is reduced when the range of the diffusive region is large in the diffuse plate 2 and diffusion is carried out in a range which exceeds the size of the corner cube prisms 30. Therefore, it is preferable to satisfy Formula (8) when Ld represents a pitch between a concavity and convexity in the diffuse plate 2.

$$L_c > L_d \tag{8}$$

In order to improve the resolution, it preferable to further lessen the pitch Ld. For example, it is preferable to satisfy Formula (8a).

$$L_c > 2 \times L_d \tag{8a}$$

On manufacturing such a corner cube array 3, a triangular pyramid shaped die is manufactured by cutting a metal in three directions. After that, a synthetic resin material is subjected to a molding process by using the triangular pyramid shaped die, in order to transcribe the die shape to the synthetic resin.

In addition, it is possible to manufacture the corner cube array 3 by etching a transparent substrate by a photolithograph process.

On manufacturing the corner cube array 3, several corner cube units may be joined to one another in boundaries in order to obtain the corner cube array 3. When using the above-mentioned process, it is possible to easily manufacture a large-scale corner cube array 3. In addition, it is possible to easily manufacture a die having high accuracy.

Incidentally, a single corner cube prism 30 may be used as a corner cube unit.

Figure 3:
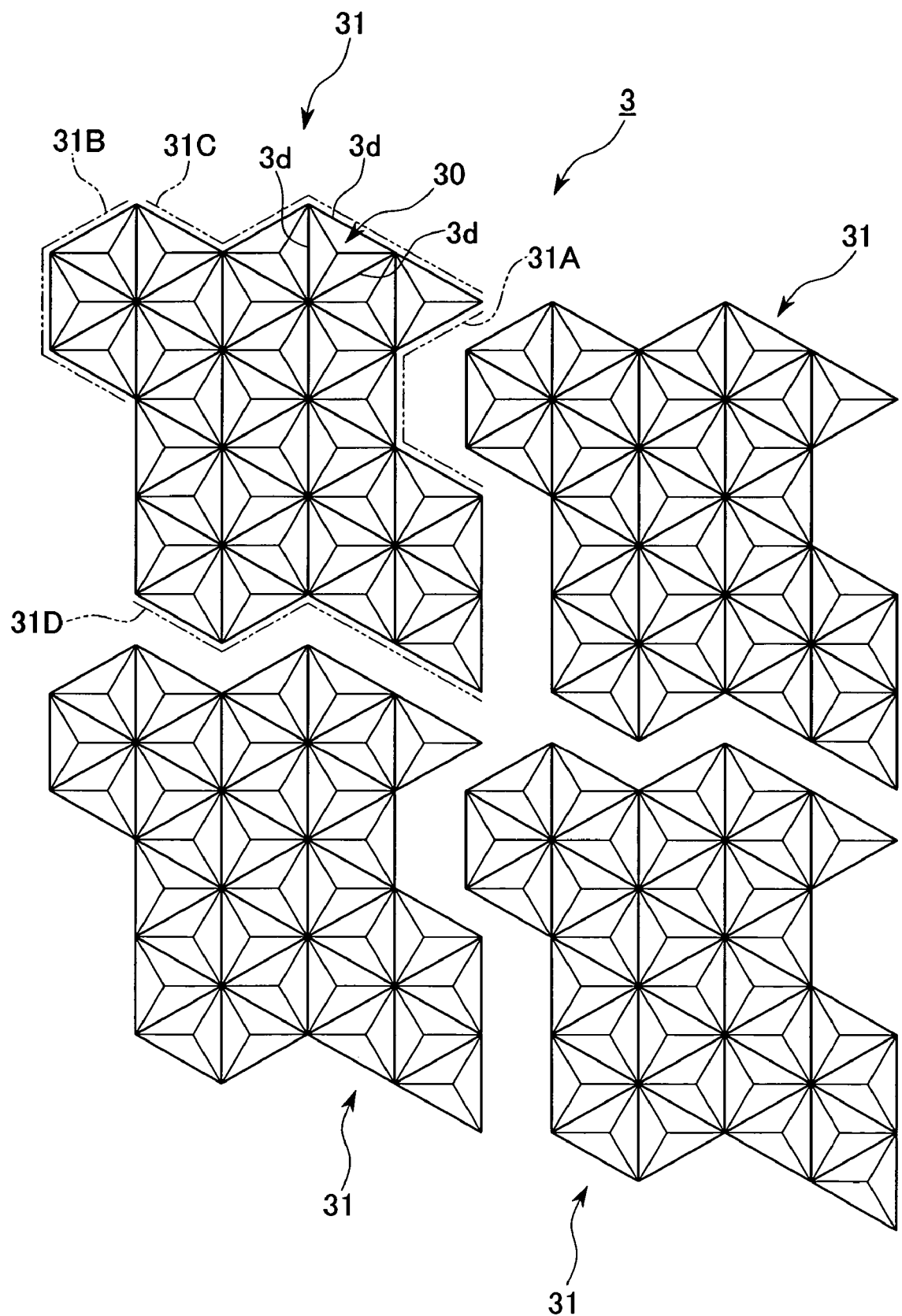
FIG. 3 shows a schematic plane view for describing an example of a corner cube unit according to an embodiment of the present invention.

Referring to FIG. 3, a description will proceed to an example of the above-mentioned corner cube unit.

FIG. 3 shows a schematic plane view for describing an example of the corner cube unit according to the embodiment of the present invention;

On obtaining a corner cube unit 31, thirty two corner cube prisms 20 are molded in one piece and joined surfaces are formed so as to make an outside shape pass through all of the adjacent ridge lines 3d.

A concave and convex shape such as a concave fitting portion 31A, a convex fitting portion 31B, a concave and convex fitting portion 31C, and a convex and concave fitting portion 31D is formed on the outside shape in each corner cube unit 31. When the concave fitting portion 31A is fitted to the convex fitting portion 31B and the concave and convex fitting portion 31C is fitted to the convex and concave fitting portion 31D between the adjacent corner cube units 31, it is possible to locate the adjacent corner cube units 31 in a plane.

By forming the outside shape having such a concave and convex shape, it is possible to easily carry out positioning and assembly of the corner cube units 31 and it is possible to easily manufacture a large-scale reflection screen 1.

Incidentally, each of the outside shape and the size is an example in the corner cube unit 31 illustrated in the drawing. It is possible to change each of the outside shape and the size according to need.

In addition, the corner cube array 3 may be constructed by the corner cube units 31 which are similar in shape to one another. Alternatively, the corner cube array 3 may be constructed by the corner cube units 31 at least one of which is different in shape to the other corner cube units 31.

Furthermore, a single corner cube prism 30 may be used as the corner cube unit 31 according to need.

In order to keep the color reproducibility good in the reflection screen 1, it is preferable to satisfy Formulas (1) and (2) by properly establishing the transmission property and the wavelength dependence of the reflectance property in the corner cube array 3. More specifically, it is possible to control the transmittance and the wavelength property of reflectance when forming a multi-layer coat on each of the transmission surface 2b and the reflection surface 3b.

As a result, the reflectance of a wavelength $\lambda_B$ which typifies the wavelength of blue is approximately equal in value to the reflectance of a wavelength $\lambda_R$ which typifies the wavelength of red, with respect to the reflectance of a wavelength $\lambda_G$ which typifies the wavelength of green, and it is possible to obtain the reflectance property in which each reflectance is balanced with respect to green, blue, and red. Therefore, it is possible to keep the color reproducibility good.

In order to provide a better color reproducibility, it is preferable to satisfy Formulas (1a) and (2a).

In order to view a bright image based on the projection light 5, it is preferable to enhance the reflectance of each of blue, green, and red. More specifically, it is preferable to satisfy Formulas (3), (4), and (5) by properly establishing transmission property and the wavelength dependence of the reflectance property with respect to each of the diffuse plate 2 and the corner cube array 3. For example, it is possible to control the transmittance and the wavelength property of reflectance when forming a multi-layer coat on each of the transmission surface 2b and the reflection surface 3b.

Next, a description will proceed to an operation of the reflection screen 1 according to the present embodiment.

Figure 4A:
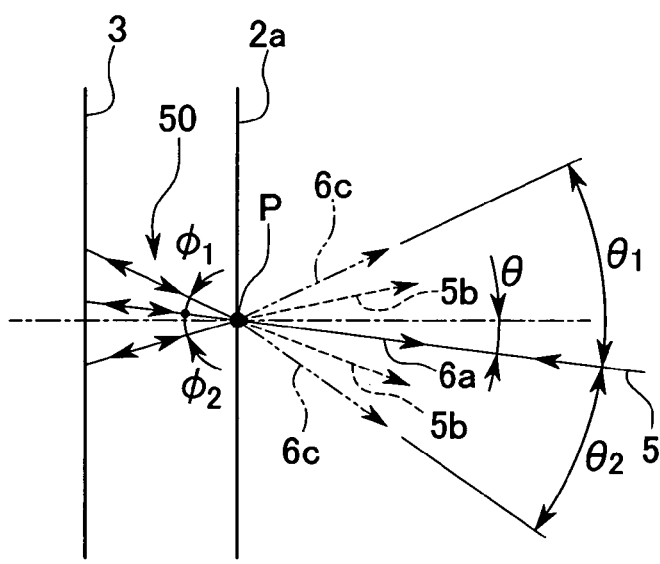
FIGS. 4A and 4B show schematic plane views for describing operation and directivity with respect to the reflection type projecting screen according to an embodiment of the present invention.
Figure 4B:
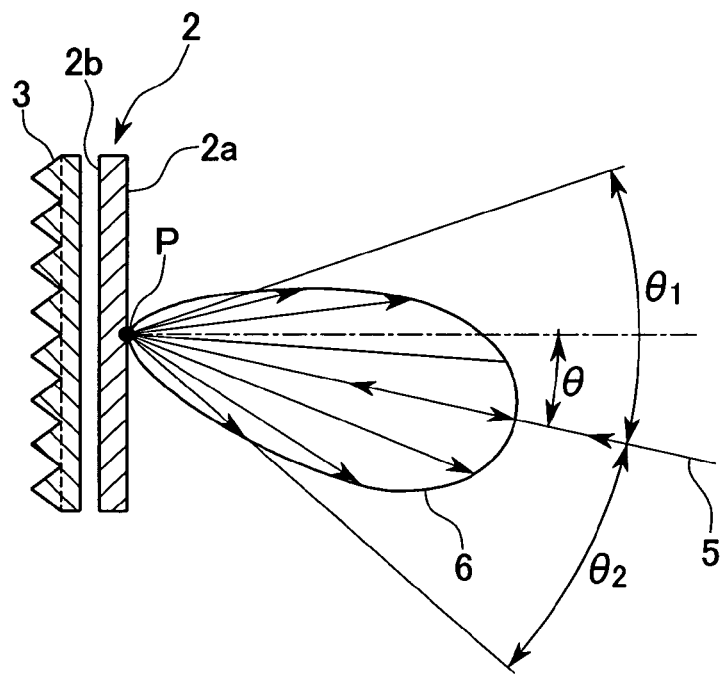
Figure 4C:
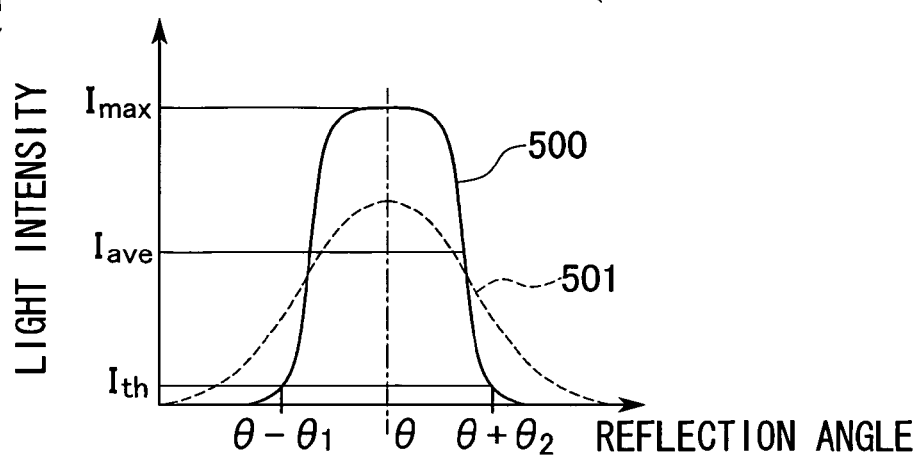
FIG. 4C is a schematic graph for describing a light intensity distribution of reflected light.

FIG. 4A shows a schematic view for describing the operation of the reflection type projecting screen according to the embodiment of the present invention. FIG. 4B shows a schematic view for describing the directivity of the reflection type projecting screen according to the embodiment of the present invention. FIG. 4C is a schematic graph for describing a light intensity distribution of the reflected light illustrated in FIG. 4B. In the graph illustrated in FIG. 4C, the horizontal axis represents an angle of reflection and the vertical axis represents light intensity.

As shown in FIG. 4A, it will be assumed that the projection light 5 represented by one light beam enters a point P on the diffuse transmission surface 2a with an incident angle θ.

When the projection light 5 enters the diffuse transmission surface 2a, the projection light 5 is partially diffused and reflected as reflected light 5a in the case of forming the reflection preventing coat on the diffuse transmission surface 2a.

The remaining light is transmitted through the diffuse transmission surface 2a and enters the corner cube array 3 as diffused light 50 which is diffused in a range between an angle $\phi_1$ and an angle $\phi_2$ with respect to the optical axis.

Inasmuch as the reflection surfaces 3a are orthogonal to one another in the corner cube array 3, the diffused light is reflected with retro-reflection. In other words, the diffused light 50 is reflected towards a direction of 180 degrees in relation to the incident direction irrespective of the incident angle and returns back to the position at which the light is diffused. To be exact, the diffused light 50 returns back to the position which slightly deviates from a point P in a plane view. But, it is possible to neglect the displacement inasmuch as the pitch Lc representing the size of the corner cube prism 30 is established at a sufficient small value.

Accordingly, it is possible to assume that the diffused light approximately returns back to the point P as shown in FIG. 4A. In other words, the diffused light 50 again enters the point P with an incident range between (θ+$\phi_1$) and (θ−$\phi_2$). Each light beam is again subjected to diffusing operation by the diffuse transmission surface 2a in the diffused light 50, and the diffused light 50 travels as screen reflected light 6c to a side of the light source (right hand in the drawing) with an angle range between (θ+$\theta_2$) and (θ−$\theta_1$), which is slightly greater than the incident range between (θ+$\phi_1$) and (θ−$\phi_2$).

As described above, the reflection type projecting screen has a high utilization efficiency of light without reducing the loss of light quantity, inasmuch as the diffused light outputted from the diffuse transmission surface 2a is reflected by the corner cube array 3 and is again outputted from the diffuse transmission surface 2a.

Incidentally, the angle range between (θ+$\theta_2$) and (θ−$\theta_1$) is defined as a range which is not less than 0.2% with respect to a peak value $I_{max}$ of light intensity distribution. Alternatively, the angle range between (θ+$\theta_2$) and (θ−$\theta_1$) may be defined as a range which is not less than 0.4% with respect to an average value $I_{ave}$ of light intensity distribution.

When the light intensity distribution of the screen reflected light 6 is schematically illustrated, it is possible to obtain the light intensity distribution having the directivity of angle θ as shown in FIG. 4B.

An example of the light intensity distribution is illustrated as a curve 500 in FIG. 4C. For comparison, a curve 501, which is given by a broken line, represents a light intensity distribution with respect to a general diffuse reflection surface which has an output angle of θ.

The peak value $I_{max}$ appears at the angle θ in the curve 500. The curve 500 has a comparatively flat light intensity distribution at the angle range between (θ+$\theta_2$) and (θ−$\theta_1$). Outside of the angle range between (θ+$\theta_2$) and (θ−$\theta_1$), the curve 500 has a light intensity distribution in which the light intensity is suddenly reduced and directivity becomes strong. A threshold value $I_{th}$ in which the angle becomes (θ+$\theta_2$) or (θ−$\theta_1$) is a value which satisfies either one of $I_{th} \geq I_{max} \times 0.02$ and $I_{th} \geq I_{ave} \times 0.04$, where $I_{ave}$ represents an average of light intensities.

The strength of directivity is represented by magnitudes of angles $\theta_1$ and $\theta_2$ and it is possible to vary the strength of directivity by changing the magnitude of diffusion in the diffuse transmission surface 2a. For example, the magnitude of directivity is adjusted by changing the angles of $\theta_1$ and $\theta_2$ to, for example, 20 degrees or 10 degrees.

Inasmuch as most of the screen reflected light 6 passes through the diffuse transmission surface 2a twice in the present embodiment, it is possible to make the diffuse magnitude of the diffuse transmission surface 2a be half in comparison to the general diffuse plate. Therefore, it is possible to greatly reduce the loss of light quantity based on the diffuse plate 2, inasmuch as the diffuse plate 2 has a developed or improved permeability.

As a result, it is easy to satisfy Formulas (1) to (5) with respect to the projection light 5 and the screen reflected light 6 and it is possible to improve the color reproducibility and the brightness.

In addition, it is possible to simply construct the corner cube array 3 in comparison to the liquid crystal reflection layer or the like, in order to improve the utilization efficiency of light.

Inasmuch as the corner cube array 3 is constructed by the corner cube prisms 30 in the present embodiment, it is possible to construct the reflection surface 3b as an internal reflection surface. It is possible to use the reflection surface 3b as a total reflection surface according to usage conditions. Accordingly, there is an advantage in which it is possible to simplify the reflecting coat or to omit the reflecting coat.

Next, a description will proceed to a first variation, a second variation, and a third variation according to the embodiment of the present invention.

Figure 5A:
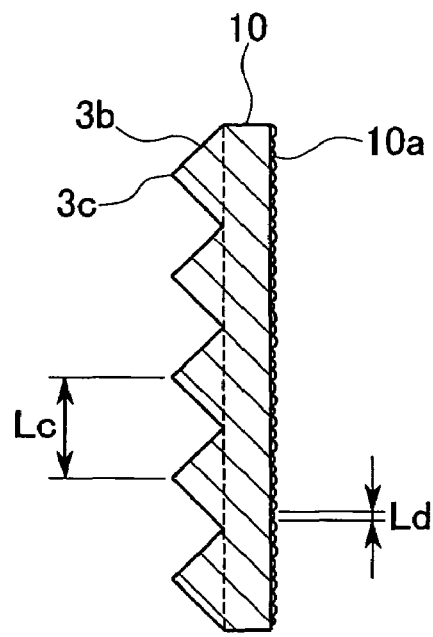
FIGS. 5A, 5B, and 5C respectively show partial sectional schematic views for describing a first variation, a second variation, and a third variation of the reflection type projecting screen according to an embodiment of the present invention, respectively.
Figure 5B:
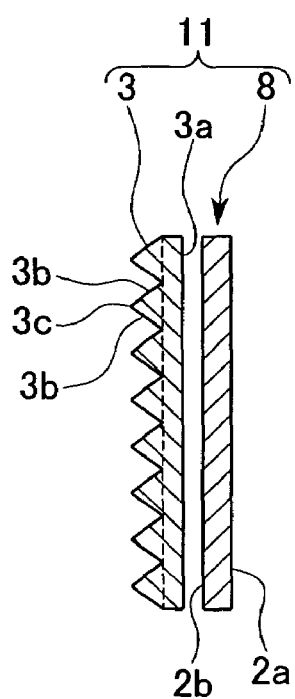
Figure 5C:
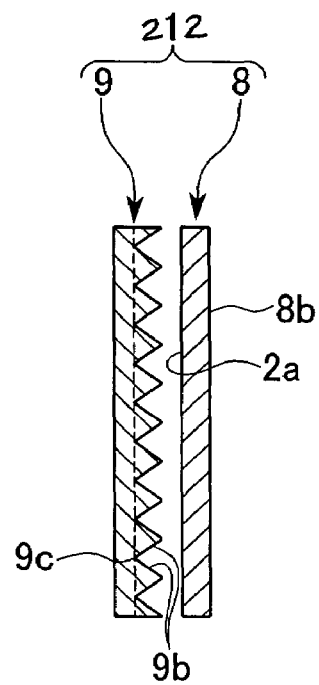

FIGS. 5A, 5B, and 5C respectively show partially schematic sectional views for describing the first variation, the second variation, and the third variation of the reflection type projecting screen according to the embodiment of the present invention.

As shown in FIG. 5A, the diffuse plate 2 is omitted in a corner cube array 10 of the first variation according to the present embodiment. Instead of the incident surface 3a, a diffuse transmission surface 10a is formed on the corner cube array 10 and the corner cube group is integral with the diffuse transmission surface, in order to construct the reflection type projecting screen as one member. A description will be mainly made as regards a structure different from the above-mentioned embodiment hereinafter.

When the diffuse transmission surface 10a is a surface which is capable of being formed on the incident surface 3a of the corner cube array 10, it is possible to form the diffuse transmission surface 10a in any fashion. More particularly, the diffuse transmission surface 10a may have a structure similar to that of the diffuse transmission surface 2a. For example, it is possible to form the diffuse transmission surface 10a whose concave and convex pitch is equal to $L_d$, by using the mat relief processing.

When forming the diffuse transmission surface 10a in the corner cube unit 31 instead of the incident surface 3a, it is possible to construct the corner cube array 10 which functions as one member, in the case of joining a plurality of corner cube units 31.

According to the above-mentioned configuration, it is possible to obtain a simple and cheap reflection type projecting screen because it is possible to construct the reflection type projecting screen as one member.

Inasmuch as optical surfaces are constructed by only the diffuse transmission surface 10a and the reflection surface 3b, there is an advantage in which the loss of light quantity is remarkably reduced.

As shown in FIG. 5B, the corner cube array 11 of the second variation according to the present embodiment comprises a diffuse plate (diffuse element) 8 instead of the diffuse plate 2 described in the above-mentioned embodiment. A description will be mainly made as regards a structure different from the above-mentioned embodiment hereinafter.

The diffuse plate 8 is a flat plate which has a transmission surface 8b and the diffuse transmission surface 2a each of which is a smooth flat plane or surface, in order from the side of the light source (right hand side in the drawing). Alternatively, the diffuse plate 8 may be a bent plate which has the transmission surface 8b and the diffuse transmission surface 2a each of which is a smooth curved surface.

The smoothness of the transmission surface 8b is acceptable when it is difficult to deposit dust, dirt, or the like on the transmission surface 2a and when it is possible to easily clean the transmission surface 2a by wiping the transmission surface 2a in the case of depositing dust or dirt.

According to the above-mentioned configuration, there is no concern about dust or dirt being deposited on the diffuse transmission surface 2a and the diffuse transmission surface 2a suffering damage, inasmuch as the diffuse transmission surface 2a is directed to the side of the corner cube array 3 and is not exposed to the outside. Therefore, there is an advantage in which it is easy to maintain a high image quality with time, inasmuch as faults, which affect the image quality and the resolution of screen reflected light 6, do not occur in the diffuse transmission surface 2a.

In addition, it is easy to clean the transmission surface 8b by wiping the transmission surface 2a in the case of depositing dust or dirt, inasmuch as the transmission surface 8b which is exposed to the outside is a smooth flat surface or smooth curved surface. Therefore, there is an advantage in which it is easy to carry out maintenance.

In addition, it is preferable to from an antistatic coat on the transmission surface 8b, in order to control the deposition of dust. Furthermore, there is an advantage in the loss of light quantity when forming the reflection preventing coat on the transmission surface 8b.

In addition, it is easy to carry out a reinforcing treatment with respect to the surface, to coat a protecting film on the surface, or to adhere a protecting sheet on the surface inasmuch as the surface is a smooth flat surface or smooth curved surface, in order to prevent damage.

As shown in FIG. 5C, a corner cube array 212 of the third variation according to the present embodiment comprises a reflector type corner cube array (corner cube group) 9 instead of the corner cube array 3 described in the second variation. A description will be mainly made as regards a structure different from the above-mentioned embodiment hereinafter.

The reflector type corner cube array 9 is constructed of a reflector type corner cube 90 as a unit in which three reflection surfaces 9b orthogonal to one another intersect at a vertex 9c. Adjacent ridge line portions 9d are joined to one another and the plane location is similar to the plane location illustrated in FIG. 2A.

Although the reflector type corner cube array 9 has concavities and convexities whose relationship is reverse to that of the corner cube array 3, it is possible to manufacture the reflector type corner cube array 9 in a manner which is approximately similar to that of the corner cube array 3. Incidentally, it is necessary to form a reflecting coat on the reflection surface 9b in the case of using a material having optical permeability. When using a material such as a metal or a silicon wafer which has a low optical permeability and which is capable of forming a reflecting mirror finished surface, it is possible to form each of the reflection surfaces 9b with a mirror finish without forming the reflecting coat.

The third variation has operation and effect similar to the second variation by the diffuse plate 8. In addition, it is possible to use the reflector type corner cube as the corner cube group inasmuch as the diffuse transmission surface 2a is formed on the diffuse plate 8.

The reflector type corner cube array 9 has an advantage of providing an enhanced flexibility in selecting a material, inasmuch as it is unnecessary for the material to have permeability.

Next, a description will proceed to a fourth variation, a fifth variation, and a sixth variation according to the embodiment of the present invention.

Figure 6A:
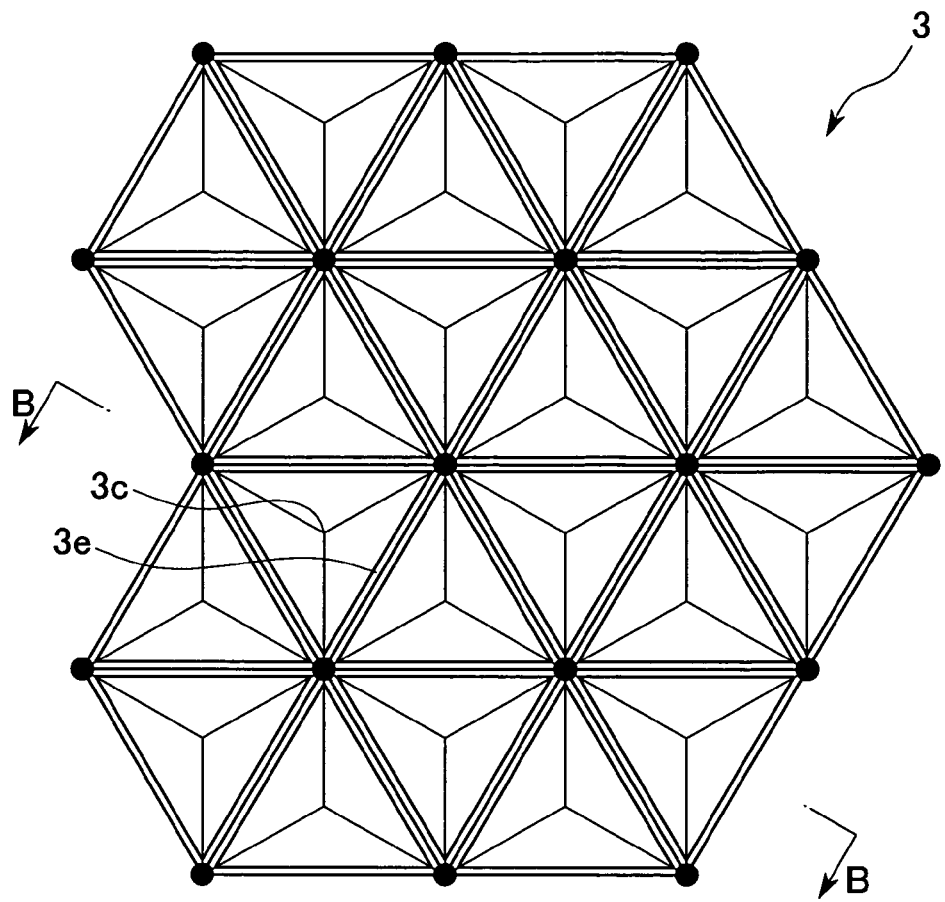
FIGS. 6A and 6B respectively show a plane schematic view and a sectional view along B-B line in FIG. 6A each of which is for describing a fourth variation of the reflection type projecting screen according to an embodiment of the present invention.
Figure 6B:
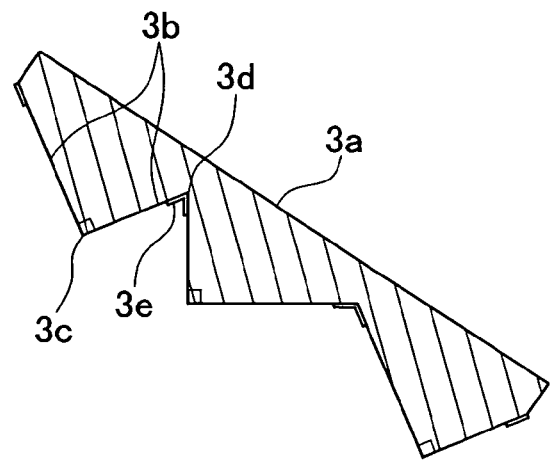
Figure 7A:
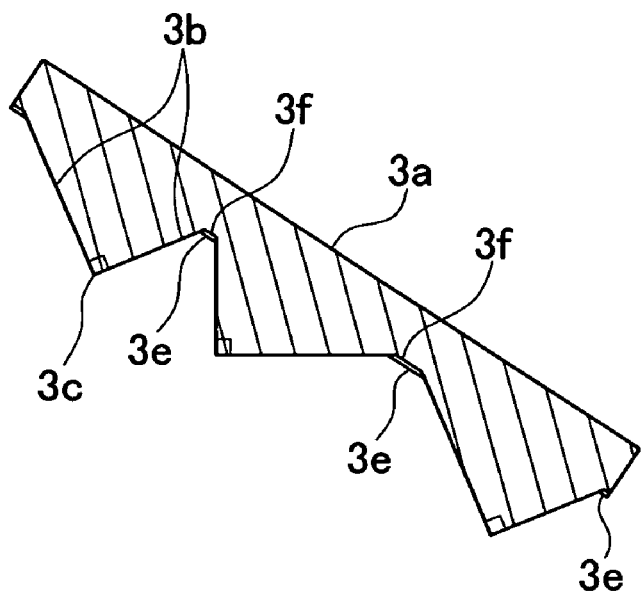
FIGS. 7A and 7B show sectional views corresponding to B-B line of FIG. 6A that are for respectively describing fifth and sixth variations of the reflection type projecting screen according to an embodiment of the present invention.
Figure 7B:
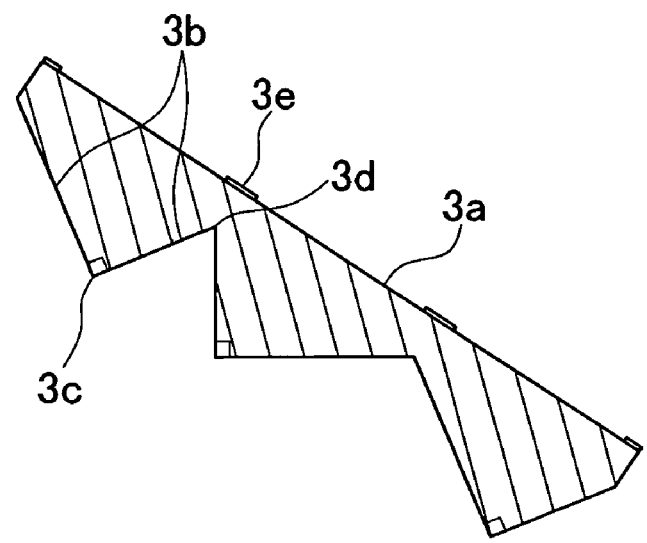

FIGS. 6A and 6B respectively show a schematic plane view and a sectional view along B-B line each of which is for describing a reflection type projecting screen of the fourth variation according to the embodiment of the present invention. FIGS. 7A and 7B show sectional views corresponding to B-B line of FIG. 6A that are for describing a reflection type projecting screen of the fifth and the sixth variations according to the embodiment of the present invention.

In the fourth variation of the present embodiment, a light shielding layer 3e is formed on each adjacent ridge line portion 3d of the corner cube array 3 according to the present embodiment. A description will be mainly made as regards a structure different from the above-mentioned embodiment hereinafter.

As shown in FIG. 6B, the light shielding layer 3e is formed by a light shielding treatment in which a light absorption coating material is applied within a range from a back side of the corner cube array 3 near each adjacent ridge line portion 3d.

Inasmuch as the light entering the adjacent ridge line portion 3d is absorbed according to the above-mentioned configuration, it is possible to prevent diffused reflection in the adjacent ridge line portion 3d. Therefore, it is possible to prevent the deterioration of contrast in the screen reflected light 6 that is based on diffused reflection light occurring in the adjacent ridge line portion 3d.

Generally, the adjacent ridge line portion 3d is susceptible to influence of a manufacturing error, but by providing the light shielding layer 3c described above, it is possible to increase an allowance range of a manufacturing error with respect to the adjacent ridge line portion 3d. As a result, there is an advantage in which the manufacturing efficiency and yields are improved.

As shown in FIG. 7A, a flat plane surface 3f is formed approximately parallel to the incident surface 3a in the fifth variation of the present embodiment, instead of the adjacent ridge line portion 3d. In the fifth variation of the present embodiment, the light shielding layer 3e is formed on a back side of the flat plane surface 3f.

Inasmuch as the flat plane surface 3f is formed instead of the adjacent ridge line portion 3d which is difficult to be manufactured, according to the above-mentioned configuration, it is easy to carry out manufacturing. In addition, it is possible to prevent reflection and diffusion in the flat plane surface 3f by forming the light shielding layer 3e. Furthermore, it is possible to easily form the light shielding layer 3e by the flat plane surface 3f.

As shown in FIG. 7B, the light shielding layer 3e is formed on the incident surface 3a which is positioned at an upper side of the adjacent ridge line portion 3d, in the corner cube array 3 of the fourth variation according to the sixth variation of the present embodiment.

Inasmuch as the incident light is shielded by the light shielding layer 3e and does not reach the adjacent ridge line portion 3d according to the above-mentioned configuration, it is possible to prevent diffusion in the adjacent ridge line portion 3d.

In addition, it is possible to easily form the light shielding layer 3e inasmuch as the light shielding layer 3e is formed on the incident surface 3a which is a plane surface or which is slightly bent. As a result, it is possible to improve manufacturing efficiency on manufacturing the corner cube array 3.

Incidentally, it is possible to appropriately replace the corner cube array 3 with the reflector type corner cube array where feasible, although a description is made in the case where the corner cube group is mainly composed of a prism group in the above-mentioned embodiment and the above-mentioned variations.

Although a description is made as regards examples each of which uses the wavelengths of $\lambda_B$=485 nm, $\lambda_G$=550 nm, and $\lambda_R$=650 nm, as the wavelengths representing light's three primary colors in Formulas (1) to (5) and Formulas (1a) and (2a) in each of the above-mentioned descriptions, each of these wavelengths is an example and it is possible to use other representative values instead of the above-mentioned wavelengths because of having a similar operation and effect when the other representative values are approximately equal to the above-mentioned wavelengths.

More specifically, it is possible to use F line (486.1 nm), e line (546.1 nm), and C line (656.3 nm) of Fraunhofer lines as the representative values of $\lambda_B$, $\lambda_G$, and $\lambda_R$, instead of the wavelengths of $\lambda_B$=485 nm, $\lambda_G$=550 nm, and $\lambda_R$=650 nm.

In the case of using LED light sources of three colors (blue, green, and red) as the light source, it is possible to adopt the radiation wavelength of each LED light source.

In addition, it is possible to use the wavelengths of color separation light of RGB, in the case of using a configuration which is color separated by a dichroic prism or a color filter, as the light source.

Although a description is made of an example where the ridge lines in which corner cubes are adjacent to one another form an equilateral triangle, as the corner cube group in each of the above-mentioned descriptions, it is possible to use a configuration in which the ridge lines adjacent to one another form an equilateral hexagon in a plane view, as another example.

Figure 8A:
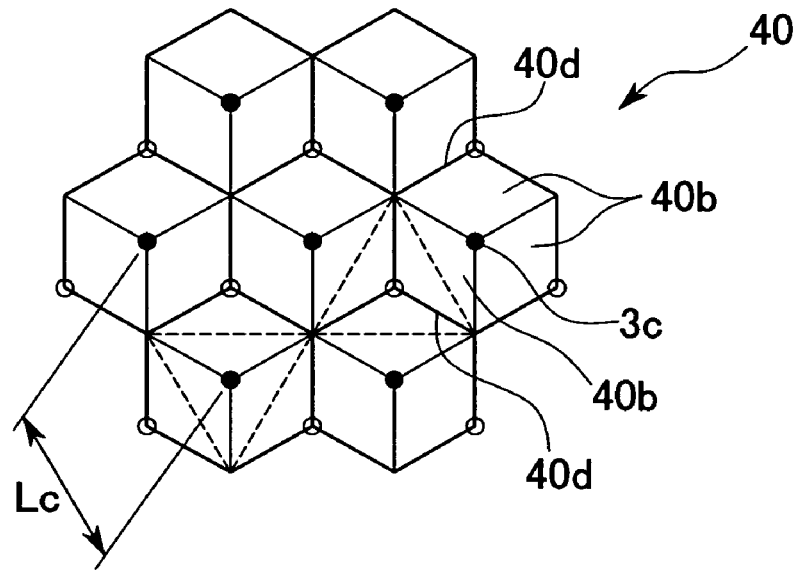
FIGS. 8A and 8B respectively show a schematic plane view and a schematic perspective view each of which is for describing a structure of a reflection surface in another corner cube group which is capable of being used in the reflection type projecting screen according to an embodiment of the present invention.
Figure 8B:
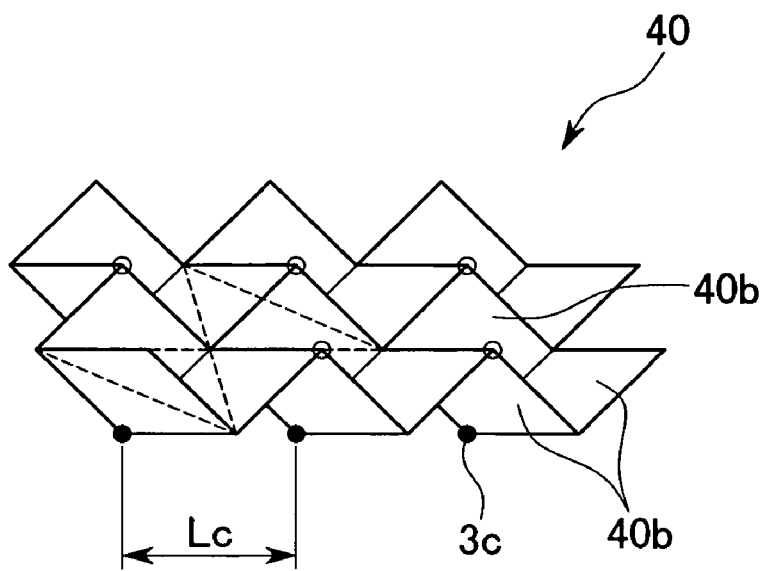

FIGS. 8A and 8B respectively show a schematic plane view and a schematic perspective view for describing a structure of a reflection surface in another corner cube group which is capable of being used in the reflection type projecting screen according to an embodiment of the present invention. In FIG. 8A, a black circle represents a vertex which projects towards the back side. A white circle represents a vertex which projects towards the front side. In addition, a broken line represents a virtual line which is positioned at an intermediate position between the vertexes and which connects other vertexes in one plane, to each other.

In a corner cube array (corner cube group) 40, each of corner cubes has square reflection surfaces 40b which are orthogonal to one another and which intersect at vertexes 3c. The corner cubes are joined to one another at adjacent ridge line portions. In this case, the pitch $L_c$ is defined by the shortest distance in which the vertexes are connected to one another in the corner cubes in a manner similar to the above-mentioned manner.

The corner cube array 40 may be manufactured as a prism or as a reflector.

More specifically, a flat plate portion of the same material is formed above each of the vertexes illustrated by the white circle, in the case of manufacturing as a prism. When making the flat plate portion be the incident surface, it is possible to form a plate shaped corner cube array 40.

In addition, the diffuse element is not limited to the plate member when the diffuse element has the smooth flat surface or the smooth curved surface and diffuse transmission surface, although a description is made as regards using the plate member as the diffuse element in each of the above-mentioned descriptions. For example, it is possible to use a member other than the plate member such as a film or a sheet member, as the diffuse element.

Front Projector System

[Second Embodiment]

A description will be made as regards a front projector system according to a second embodiment of the present invention.

Figure 9A:
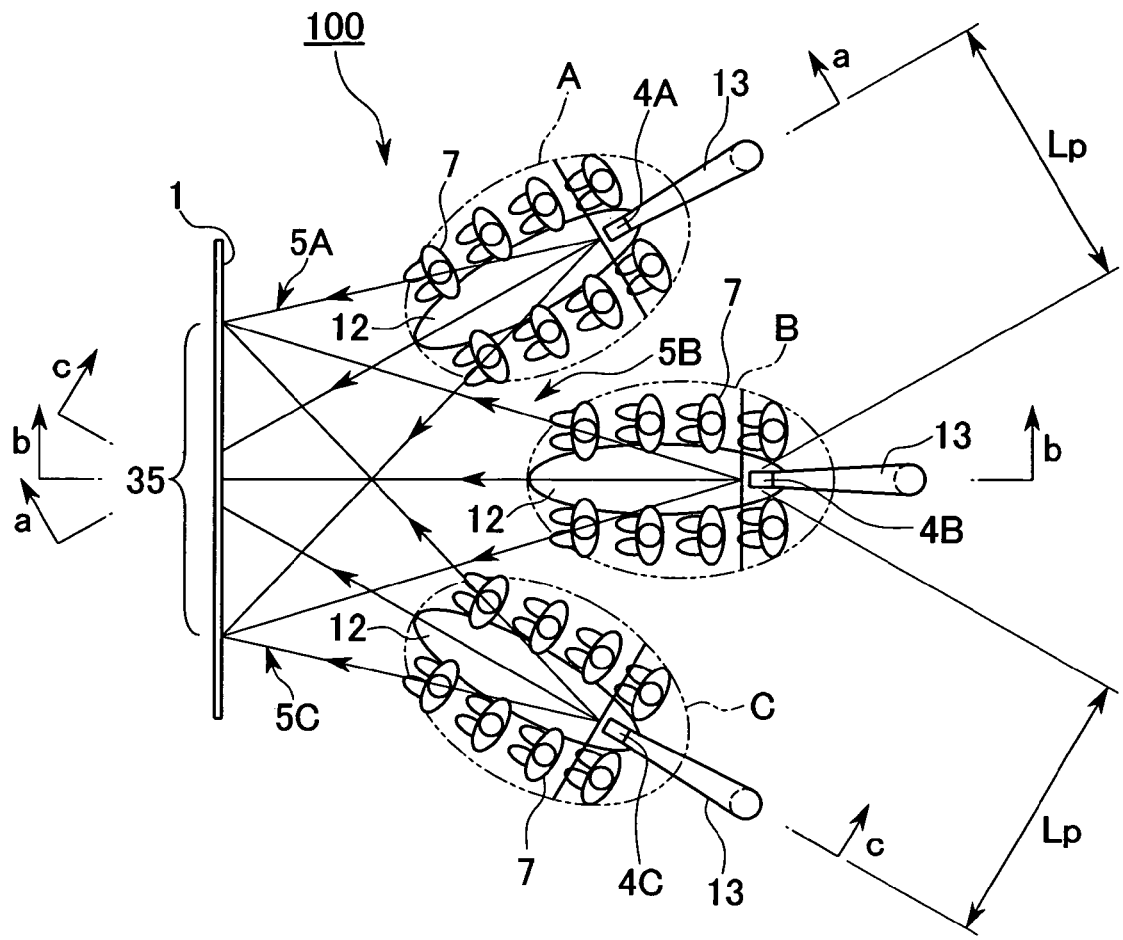
FIGS. 9A and 9B respectively show a schematic plane view and a schematic view of a-a section (b-b section, c-c section) each of which is for describing an outline structure of a front projector system according to a second embodiment of the present invention.
Figure 9B:
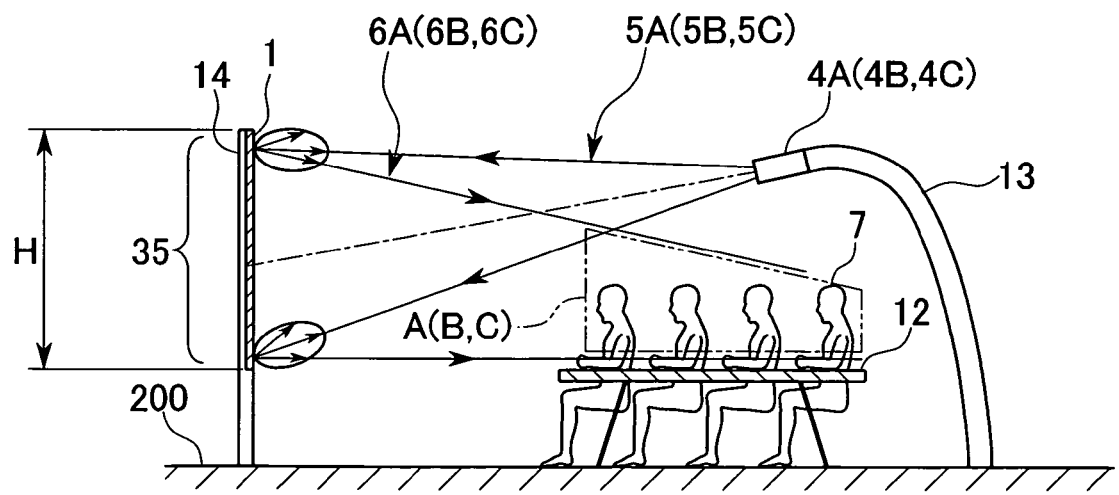
Figure 10:
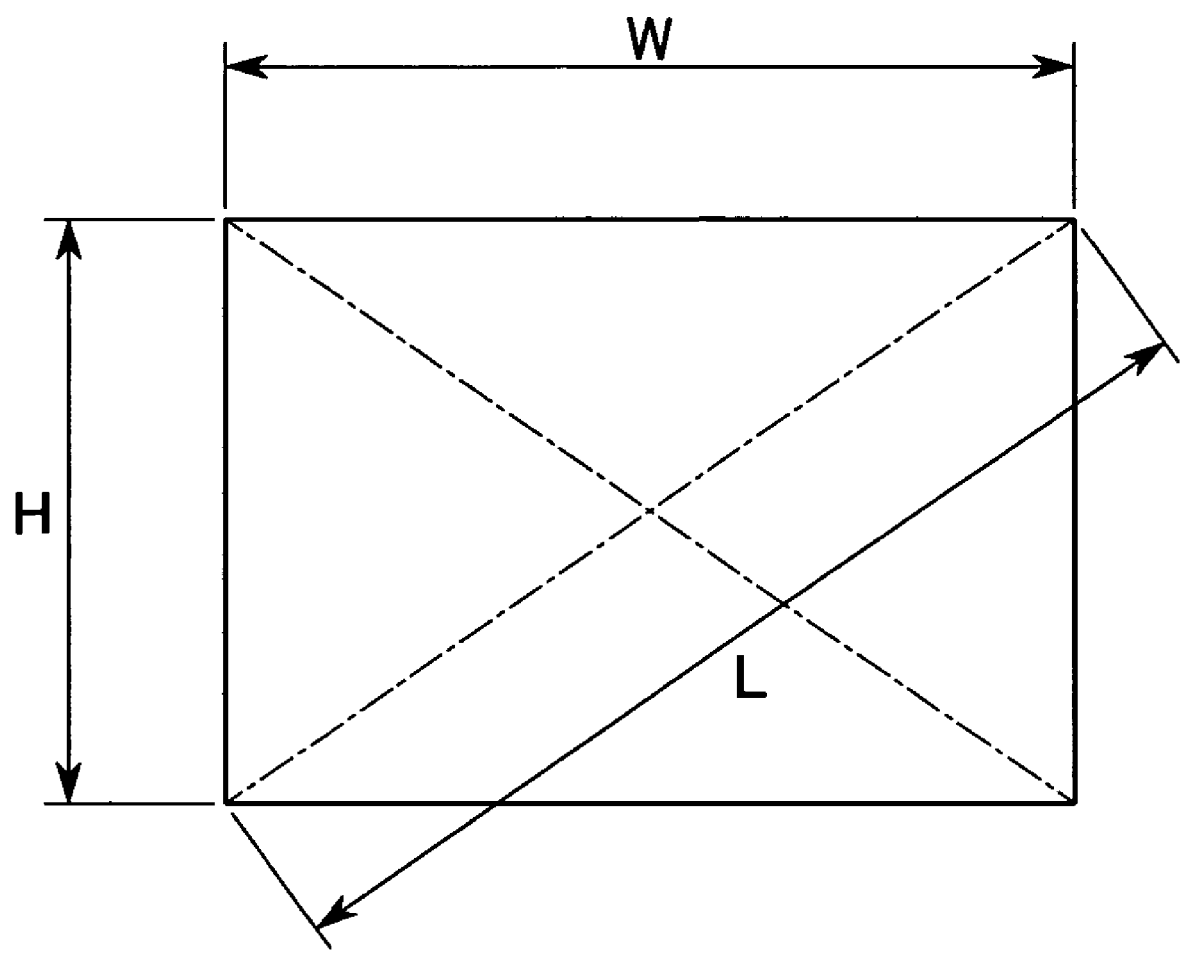
FIG. 10 shows a schematic front view for describing a structure of a reflection screen used in the front projector system according to the second embodiment of the present invention.

FIG. 9A shows a schematic plane view for describing an outline structure of a front projector system according to the second embodiment of the present invention. FIG. 9B shows a schematic view of a-a section (b-b section, c-c section) in FIG. 9A. FIG. 10 shows a schematic front view for describing a structure of a reflection screen used in the front projector system according to the second embodiment of the present invention.

A projector system (front projector system) 100 according to the present embodiment projects a plurality of images on the reflection screen and is capable of projecting only one of the images on respective viewing regions which are independent of one another.

As shown in FIG. 9A, the front projector system 100 comprises projectors 4A, 4B, and 4C and the plate shaped reflection screen 1 which is supported by a screen supporting member 14 in an approximately vertical direction with respect to a floor 200. The projectors 4A, 4B, and 4C are for projecting projection lights 5A, 5B, and 5C on rectangular projecting regions, respectively. The projection lights 5A, 5B, and 5C are used to project the images each of which may be, for example, a static image or a dynamic image. Each of the projectors 4A, 4B, and 4C comprises an apparatus such as a slide projector, a cinema projector, a video projector, a liquid crystal projector, or the like or an apparatus section for projecting the image. In other words, each of the projectors 4A, 4B, and 4C comprises a light source, a spatial light modulating element, and a projecting lens. The spatial light modulating element is illuminated by the light emitted from the light source and forms an optical image. The projecting lens is for projecting the optical image produced by the spatial light modulating element.

Each of the projectors 4A, 4B, and 4C is supported by a supporting member 13 which may be shaped into a bent beam shape.

The projectors 4A, 4B, and 4C may be individual apparatuses which are similar in structure to one another or which are different in structure from one another. Alternatively, the projectors 4A, 4B, and 4C may be apparatus sections which project a plurality of projection lights from a single apparatus, when the apparatus sections have output openings of projection lights that are different in position from one another. Furthermore, a control section and a signal source are used in common in the projectors 4A, 4B, and 4C.

In the following description, the suffixes A, B, and C are omitted from the projectors each of which will be collectively called the projector 4, and a description will be made which is common to the projectors 4A, 4B, and 4C. Each of the projection lights 5A, 5B, and 5C may be called a projection light 5 and each of image reflected lights 6A, 6B, and 6C described hereinafter may be called an image reflected light 6.

The projector 4B is positioned at a direction of a normal line which passes through an approximate center of the reflection screen 1 in a horizontal direction. As shown in FIG. 9B, the projector 4B is positioned above the normal line which passes through the center of the reflection screen 1, in a vertical sectional plane. The projector 4B projects the projection light 5B from a slanting upper direction while directing its optical axis to the center of reflection screen 1.

A viewing region B is formed below the projector 4B. The image reflected light 6B, which is obtained by reflecting the projection light 5B, reaches the viewing region B and it is possible to view the image projected in accordance with the projection light 5B, on the reflection screen 1.

Incidentally, the viewing region B is a region having a virtual three-dimensional space. Although an ellipse of a chain double-dashed line is drawn in the illustrated example, such a partition line or a partition does not exist in the present embodiment. A table 12 is located, and chairs (not shown) on which viewers sit are located around the table 12 (Each of viewing regions A and C described hereinafter is similar to the viewing region B). Accordingly, eyes of the viewer are positioned within the viewing region B when the viewer sits around the table 12.

Although it is possible to establish the height of the projector 4B to an appropriate height, it is preferable to position the projector 4B below the viewing region B or above the viewing region B, in order to smoothly carry out the projection and viewing. In order to form a space in front of a front region of the reflection screen 1, it is preferable to position the projector 4B above the upper end of the reflection screen 1 in a height direction. Alternatively, the projector 4B is positioned below the lower end of the reflection screen 1 in the height direction.

As shown in FIG. 9A, the projectors 4A and 4C are positioned at a right side and a left side of the projector 4B in a horizontal direction, respectively. The projectors 4A and 4C project the projection lights 5A and 5C on a region which is overlapped in a region on which the projection light 5B is projected, when the projection light 5B is projected on the reflection screen 1. Accordingly, a common projecting region (common region) 35 is formed on the reflection screen 1. The images produced by the projection lights 5A, 5B, and 5C are overlapped on the common projecting region 35.

The viewing regions A and C are formed below the projectors 4A and 4C, respectively. The image reflected lights 6A and 6C, which are obtained by reflecting the projection lights 5A and 5C on the reflection screen 1, reach the viewing regions A and C. It is possible to view the images which are produced by the projection lights 5A and 5C, in the viewing regions A and B, respectively.

The position of each of the projectors 4A and 4C may be different in a height direction from that of the projector 4B. Although each of the projectors 4A and 4C may be positioned below the reflection screen 1 according to need, each of the projectors 4A and 4c is positioned at a height equal to the height in which the projector 4B is positioned, in the illustrated example.

The reflection screen 1 is a reflecting member which reflects the incident light in a direction (predetermined direction) which forms an angle of approximately 180 degrees with respect to an incident direction. Furthermore, the reflecting member diffuses the incident light within a prescribed angle range which may be between 0 degree and 30 degrees, with respect to the predetermined direction.

Now, the angle range of diffused light satisfies any one of a value which is not less than 0.2% in the angle range with respect to the peak value $I_{max}$ of light intensity distribution and a value which is not less than 0.4% in the angle range with respect to the average value $I_{ave}$ of light intensity distribution. In the above-mentioned configuration, it is possible to prevent the light from substantially leaking out of the angle range of diffused light when controlling the maximum brightness in the projection side.

As described in conjunction with FIG. 1B, the reflection screen 1 comprises a diffuse plate (diffuse element) 2 and a corner cube array 3 which are held at a constant distance and are located in an order of the diffuse plate 2 and the corner cube array 3 from a front side (side of projector 4, right hand side) of the reflection screen 1.

Incidentally, the reflection screen 1 has an approximately rectangular shape of a width W and a height H in a front view. A length of a diagonal line is $L=\sqrt{(W^2+H^2)}$ in the reflection screen 1 (referring to FIG. 10).

The diffuse plate (diffuse element) 2 is a plate member in plane view. The diffuse transmission surface 2a, which allows the incident light to pass therethrough while diffusing the incident light, is formed on the diffuse plate (diffuse element) 2 in a side which faces the reflection screen 1. The transmission surface 2b outputting the transmitted light is formed on the diffuse plate (diffuse element) 2 in a side which faces the corner cube array 3.

A description will be omitted with respect to the diffuse plate 2 and the corner cube array 3 capable of being used in the reflection screen of the front projector system according to the second embodiment of the present invention, inasmuch as a description is made about the examples of the diffuse plate 2 and the corner cube array (corner cube group) 3 in conjunction with FIG. 1B and FIGS. 2A and 2B.

Incidentally, $0° < \theta_1 \leq 30°$ and $0° < \theta_2 \leq 30°$ by adjusting the diffuse magnitude of the diffuse plate 2 in the present embodiment. Therefore, it is possible to reflect the diffused light to independent regions, when the incident lights enter the reflection screen from three directions. In order to reflect the diffused light to a large number of independent regions, it is preferable to make the directivity sharp. More particularly, it is preferable to adjust the directivity in which each of $\theta_1$ and $\theta_2$ is within 25°, 20°, or 10°.

In the present embodiment, the reflection screen 1 reflects the projection light in a direction which forms an angle of approximately 180 degrees with respect to the incident direction and reflects the projection light as the diffused light having directivity in an angle range such as $(\theta_1+\theta_2)$.

In addition, the incident direction with respect to the reflection screen 1 is included in a range which defines the reflection direction with respect to the diffused light.

Incidentally, the directivity of a horizontal section is similar to the directivity of a vertical section, although a description is made about the directivity in the vertical section in the present embodiment.

Next, a description will proceed to an operation of the projector system 100 according to the present embodiment. Incidentally, a description will be made from a two-dimensional perspective with reference to FIG. 11, in order to simplify the description.

The projector 4A is positioned at a position which is apart by a distance d from the reflection screen 1.

When the projection light 5A is projected from the projector 4A to the reflection screen 1, the projection light 5A spreads from a point $K_A$ in a predetermined radiating angle ($\angle SK_A T$) and is projected on the common projecting region 35 of the reflection screen 1.

The projection light 5A projected on the reflection screen 1 is retro-reflected in the direction which forms the angle of approximately 180 degrees with respect to the incident direction, and is diffused within a constant angle range $(\theta_1+\theta_2)$ with respect to the reflection direction as the image reflected light 6A, by the reflection screen 1, where $\theta_1=\angle K_A SJ_A$ and $\theta_2=\angle K_A SM_A$.

In other words, the image reflected light 6A returns back within the range of a line segment $J_A M_A$ whose center is a point $K_A$, in plane view, when positioning the projector 4A at the above-mentioned position.

Therefore, it is possible to observe the information given by the projection light 5A which is positioned in a line segment ST, in the range of the line segment $J_A M_A$.

Similarly, the projector 4B projects the projection light 5B from a point $K_B$ in a range of $\angle SK_B T$. The light reflected on the line segment ST of the reflection screen 1 returns back to a line segment $J_B M_B$ whose center is the point $K_B$, as the image reflected light 6B. Incidentally, a point Q represents a point of intersection of line segments $SJ_B$ and $TM_A$. $d_0$ represents a distance between the reflection screen 1 and the point Q.

The projection lights 5A and 5B are overlapped in a region given by $\Delta SQTB$ that is a region in which both of the projection lights 5A and 5B are mixed. In other words, it is possible to view only the projected image based on the projection light 5A (5B) in the outside of the mixed region which is included in the region in which the image reflected light 6A (6B) arrives. Therefore, it is possible to reliably avoid the mixture of both images in the region which is at least a distance d0 away.

Figure 11:
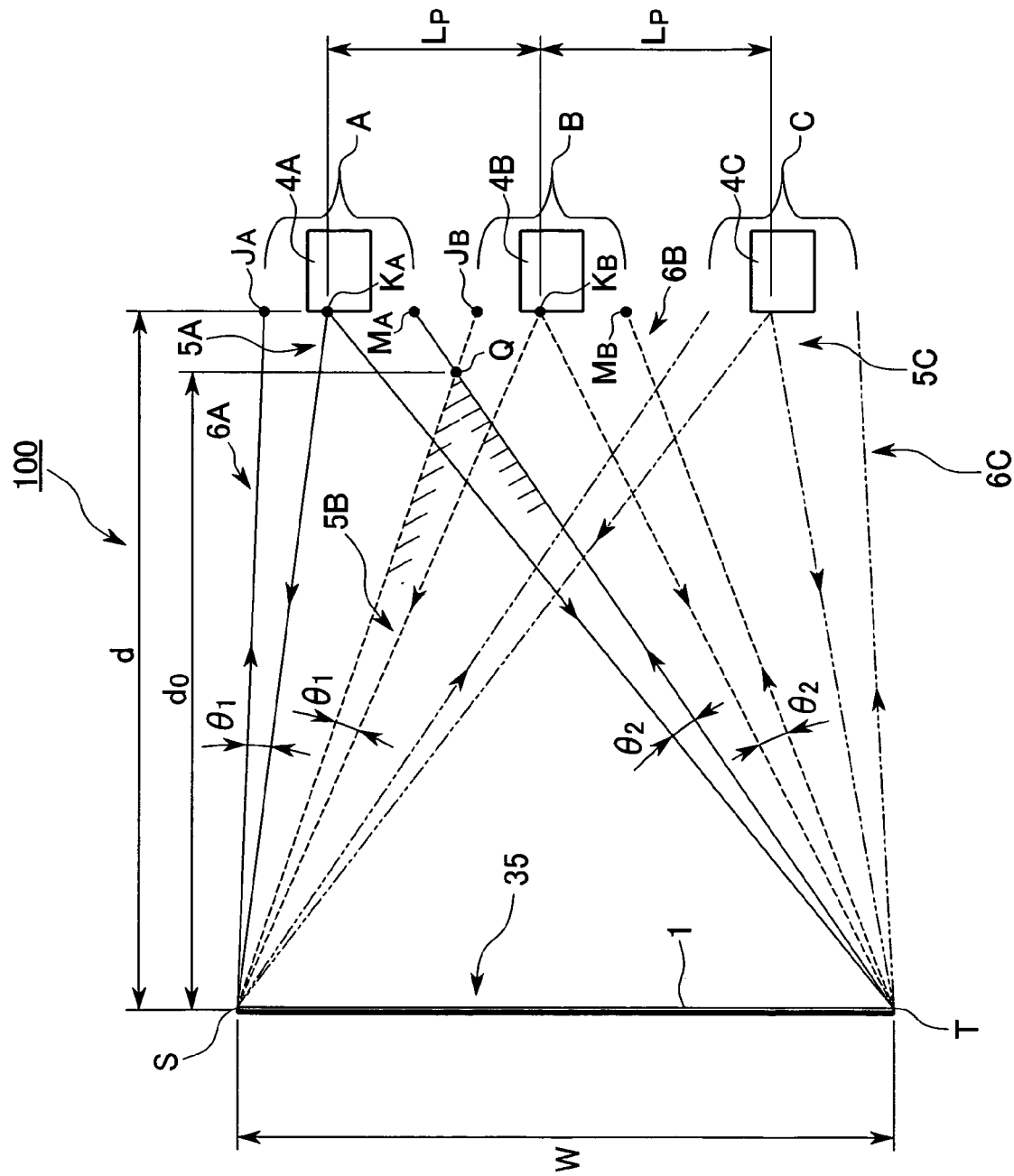
FIG. 11 shows a schematic plane view for an optical path for describing an operation of the front projector system according to the second embodiment of the present invention.

By the way, the distance $d_0$ becomes large even if the magnitude is constant in diffusion when the angle of view enlarges in the projector 4 as can be readily understood from FIG. 11. In addition, the range in which the image reflected light 5 arrives becomes narrow. Accordingly, it is necessary to enlarge the distance d0 to a certain degree of extent, in order to form the viewing region in which crosstalk occurs, near the projector 4. Under these circumstances, it is preferable to satisfy Formula (9).

When satisfying Formula (9), it is possible to form the viewing region in which crosstalk occurs between the adjacent viewing regions, even though the projection light 5 is projected at a half angle of view of 25 degrees. As a result, it is possible to panoramically view the image.

Incidentally, it is preferable to further enlarge the distance d0, in order that crosstalk does not occur even if the distance between the adjacent projectors 4 is shorter or in order to install a number of projectors. More specifically, it is preferable to satisfy Formula (9a).

Although the description is made from a two-dimensional perspective, it is possible to be understood in a similar manner in the case of a three-dimensional perspective.

As an example of a location of the projector system 100, the projecting region has a size of W=2000 mm, H=1500 mm, and L=2500 mm in the reflection screen 1. When the angle range is $\theta_1=\theta_2=10°$ with respect to the incident direction of the diffused light, the distance between the center of the reflection screen 1 and each projector 4 is d=3000 mm and the distance between each projector 4 is $L_p$=1400 mm in the projector system 100.

In other words, the viewers in the viewing regions A, B, and C, are capable of viewing the projected images based on the projection lights 5A, 5B, and 5C, respectively. In addition, the view is not blocked by the outside light inasmuch as the outside light is approximately retro-reflected towards the incident direction.

Although the projectors 4 are positioned at positions each of which is apart by the same distance from the reflection screen 1, in the above description, it is obvious that it is possible to approximate the projectors 4A and 4C to the reflection screen 1. For example, it is possible to use a radial location as shown in FIG. 9A.

In addition, it is possible to view the image with a sufficient brightness even if the image has comparatively low brightness, inasmuch as the utilization efficiency of light is high in the reflection screen and the image reflected light 6 has directivity.

Furthermore, it is possible to form the viewing region near the projector 5 and it is easy to adjust the position of projection, because of using the retro-reflection.

In addition, there are advantages in which flexibility is high in the location of the projector 4 in relation to the reflection screen 1 and flexibility is high in the number of projectors, inasmuch as it is possible to establish the incident angle without restraint within the angle range of diffused light when the viewing regions are overlapped with the projectors.

Inasmuch as the viewing regions are formed near the projectors 4, it is possible for the viewer 7 to easily carry out operations of the projectors 4 while viewing the image.

[Third Embodiment]

A description will proceed of a front projector system according to a third embodiment of the present invention.

Figure 12:
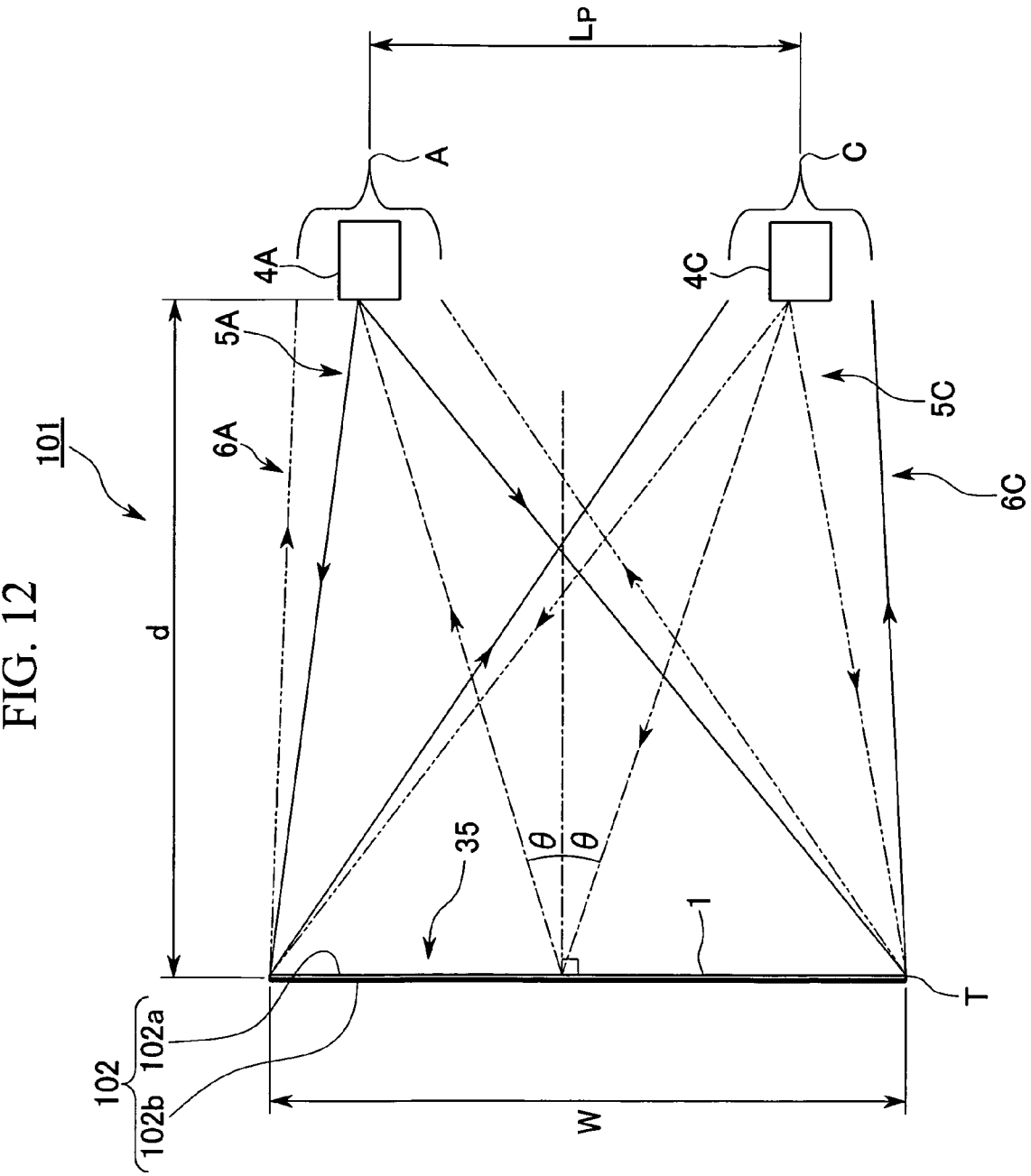
FIG. 12 shows a schematic plane view for describing an outline structure of a front projector system according to a third embodiment of the present invention.

FIG. 12 shows a schematic plane view for describing an outline structure of the front projector system according to the third embodiment of the present invention. A projector system (front projector system) 101 according to the third embodiment comprises a reflection screen 102 instead of the reflection screen 1 used in the projector system 100 described in the second embodiment. The projector system 101 comprises the projectors 4A and 4C which are similar in structure to the second embodiment. In the example being illustrated, the projector 4A projects the projection light 5A in the range in which the projection light 5A is overlapped with the projection light 5C, with the incident angle $\theta$. The projector 4C projects the projection light 5C in a direction having output angle $\theta$ in which the projection light 5A is outputted. A description will be mainly made as regards a structure different from the above-mentioned second embodiment hereinafter.

The reflection screen 102 is a diffusive reflecting member having directivity. The reflection screen 102 reflects the incident light towards a direction (predetermined direction) of mirror reflection (regular reflection) and diffuses the incident light within a predetermined angle range with a center in the regular direction. More specifically, the reflection screen 102 comprises a diffusive member (diffuse element) 102a and a reflecting member 102b having a smooth mirror surface. The diffusive member 102a and the reflecting member 102b are positioned in an order of the diffusive member 102a and the reflecting member 102b from the side (right side in the drawing) in which each projector 4 is positioned.

It is possible to use a diffuse transmission member which transmits the incident light to the reflecting member 102b and transmits the light reflected by the reflecting member 102b. The diffuse transmission member diffuses the light entering therethrough with an appropriate angle range which may be, for example, an angle range between 0° and 30° with respect to the incident direction. Accordingly, it is possible to use a structure similar to the diffuse plate 2.

Incidentally, it is preferable to form the diffuse transmission surface of the diffusive member 102a on the reflecting member 102b, in order that the reflected light obtained by reflecting the diffused light passing through the diffuse transmission surface by the reflecting member 102b passes near the diffusive position.

According to the above-mentioned configuration, the projection light 5A is diffused and reflected as the image reflected light 6A by the reflection screen 102 with a center in the regular direction. As a result, it is possible to view the projected image based on the projection light 5A, in the viewing region C. Similarly, it is possible to view the projected image based on the projection light 5C, in the viewing region A. When appropriately establishing the distance d with respect to the reflection screen 102 and the distance $L_p$ between the projectors 4A and 4C, the projected images based on the projection lights 5A and 5C are not viewed in the viewing regions A and C, respectively. More particularly, it is preferable to establish the distance d which satisfies Formula (9) in a manner similar to the second embodiment. It is further preferable to establish the distance d which satisfies Formula (9a).

Accordingly, it is possible to view the projected images based on a plurality of projection lights 5, in a plurality of independent viewing regions A and C, respectively, on projecting the projection lights 5 on one reflection screen 102.

Under these circumstances, there is an advantage in which it is easy to manufacture the reflection screen 102, inasmuch as it is possible to use the reflecting member 102b having a smooth mirror surface, as the reflection screen 102.

In a variation of the present embodiment, a mirror having a concave surface or a convex surface is used as the reflecting member 102b and a Fresnel lens is positioned between the reflecting member 102b and the diffusive member 102a. As a result, it is possible to adopt a configuration which shifts the reflection direction from the regular direction or which converges the reflected light to adjust to a range in which the diffused light arrives.

Incidentally, it is possible to use a configuration in which the ridge lines adjacent to one another form an equilateral hexagon in plane view, as another example, although a description is made as regards the example in the case where the ridge lines in which corner cubes are adjacent to one another form an equilateral triangle, as the corner cube group in the description of the second embodiment.

It is possible to use the structure of the reflection surface of the other corner cube group illustrated in FIGS. 8A and 8B, in the reflection screen according to the embodiment of the present invention.

Although the reflection screen 1 comprises the diffuse plate 2 and the corner cube array 3 in the description of the second embodiment, it is possible to adopt a corner cube array integral with the diffuse transmission surface by using the incident surface of corner cube array as the diffuse transmission surface 2a. In this case, it is possible to further improve the utilization efficiency of light because the light diffusive surface is omitted. Furthermore, it is possible to make the structure cheaply because the number of parts is reduced.

Although the diffuse plate 2 has the diffuse transmission surface 2a which faces the projecting apparatus in the description of the second embodiment, the transmission surface 2b may be formed of a smooth flat surface or a smooth curved surface. The transmission surface 2b may be positioned at the side of the projecting apparatus and the diffuse transmission surface 2a may be positioned at the side of the corner cube array 3.

In this case, there is an advantage in which it is possible to obtain a structure highly resistant to dust and dirt, inasmuch as the diffuse transmission surface 2a is not exposed to the outside. Even if dust and dirt are attached to the diffusive surface 2b, it is possible to easily clean the diffusive surface 2b because the diffusive surface 2b is formed by the smooth flat plane or the smooth curved surface.

Although a description is made as regards the corner cube array composed of prisms in the second embodiment, it is possible to use the corner reflector type corner cube array which uses the surface reflecting mirror as the reflection surface. In this case, there is an advantage in which it is possible to construct the corner cube array with a material having no light permeability.

Although the projector system has three or two projectors in the above description, it is possible for the projector system to have a plurality of projectors when the viewing regions are not overlapped.

In the case where the projector system has one projector, there is no problem in which the viewing regions are overlapped in any configuration. However, inasmuch as it is possible to definitely establish the viewing region, the viewing region can be easily established without using booths or partitions, in order to hold a conference in which secrecy is required. In addition, there is an advantage in which it is possible to effectively use the other spaces for purposes other than viewing.

Although it is assumed that a plurality of images are different from one another in the above description, a part of the images or all of the images may be similar to one another when the images enter the reflection screen in directions which are different from one another.

Crosstalk does not occur in the case where all of the images are similar to one another. Similarly, there is an advantage in which it is possible to establish a plurality of viewing regions which are spatially limited.

In addition, the reflection screen may be slightly bent in order to easily view the image, although the reflection screen is shaped into a flat plate in the above description.

Although all of the images, which are projected from a plurality of projectors in different directions with respect to the reflection screen, are reflected on the common region of the reflection screen as a preferable example in the above description, it is possible to effectively use the reflection screen when a part of at least two images are reflected on the common region.

Although a description is made in the case where the viewing region is the virtual space in the above description, it is possible to make the viewing region visible or to make the viewing region be substantial by forming partition lines on the floor or locating divider plates or booths, without soundproofing booths.

Although a description is made in the case where the predetermined direction in which the images are reflected or transmitted is one in the above description, the images may be reflected or transmitted in a plurality of predetermined directions and may be diffused in the predetermined directions. As a result, it is possible to view the same image in each of a plurality of viewing regions.

More specifically, it is possible to configure the reflection screen which has two directions of an incident direction and regular reflecting direction as the predetermined directions, when a half mirror is formed between the diffuse transmission surface and the corner cube array in order to branch the projection light.

Although a description is made in the case where the predetermined direction in which the image is reflected is a retro-reflecting direction which forms approximately 180 degrees with respect to the incident direction and in the case where the output direction is the regular reflecting direction which is line symmetric to the incident direction with respect to the direction of the normal to the reflection surface, the predetermined direction in which the image is reflected is not limited to each of the above-mentioned directions. More particularly, it is possible to form the diffused light having directivity in a direction which is different from the retro-reflecting direction and the regular reflecting direction, when changing a central direction of diffused light by giving a bias to the directivity of diffused light by the reflection screen.

Although a description is made as regards the example which uses the projectors A and C which project the projection lights to the reflection screen 102 at the incident angles of ±θ in plane view, in the third embodiment, it is possible to locate the projector at a position in which the incident angle becomes 0° in plane view. When the projection light is projected at the incident angle of 0° in plane view by the magnitude of θ and the incident angle of the height direction based on the height of the projector, in the configuration of reflection screen 102, it is possible to form the viewing region in which only the image based on the projection light is capable of being viewed.

In addition, the reflection screen in which the regular reflecting direction is the predetermined direction is not limited in structure to the reflection screen 102.

Although a description is made as regards the example in which the diffuse element is the plate member, the diffuse element is not limited to the plate member when the diffuse element has the smooth flat surface or the smooth curved surface and the diffuse transmission surface. For example, it is possible to use a film, a sheet member, or the like other than the plate member, as the diffuse element.

In order to keep the color reproducibility good, it is possible to control wave properties such as reflectivity and transmittance when a multi-film coat is formed on the diffusive surface 2b or the reflection surface 3b in the reflection screen 1 described in the second embodiment.

When light of wavelengths of $\lambda_B$=485 nm, $\lambda_G$=550 nm, and $\lambda_R$=650 nm enters the reflection screen, it is preferable to satisfy the following Formulas.

$$0.8 \leq (R_B/I_B)/(R_G/I_G) \leq 1.25 \quad (1)$$

$$0.8 \leq (R_R/I_R)/(R_G/I_G) \leq 1.25 \quad (2)$$

Where $I_B$, $I_G$, and $I_R$ represent the incident light intensities of wavelengths of $\lambda_B$, $\lambda_G$, and $\lambda_R$, respectively, and $R_B$, $R_G$, and $R_R$ represent the output light intensities of wavelengths of $\lambda_B$, $\lambda_G$, and $\lambda_R$, respectively.

Under these circumstances, the reflection coefficients of wavelengths $\lambda_B$ and $\lambda_R$, which represent blue and red, are established to values each of which is approximately equal to the reflection coefficient of wavelength $\lambda_G$, which represents green. It is possible to obtain the reflecting property while keeping blue, red, and green in balance. Therefore, the color reproducibility becomes good.

Incidentally, it is preferable to make the ranges given by the Formulas (1) and (2) narrow, in order to realize better color reproducibility. For example, it is preferable that an upper limit value and a lower limit value are 1.15 and 0.9 in the ranges given by the Formulas (1) and (2), respectively.

In order to obtain a bright image and view a bright image based on the projection light 5, it is preferable to make the reflection coefficients high in relation to blue, green, and red. More specifically, it is preferable to satisfy the following Formulas in the case of appropriately establishing the wavelength dependence of transparent property and reflecting property in the corner cube array by forming the multi-film coat on the transmission surface 2b or the reflection surface 3b.

$$0.5 \leq R_B/I_B \leq 1 \quad (3)$$

$$0.5 \leq R_G/I_G \leq 1 \quad (4)$$

$$0.5 \leq R_R/I_R \leq 1 \quad (5)$$

Although the formulas (1) to (5) hold true for each of the optional incident angles, it is better that formulas (1) to (5) hold true for the range of incident angle which is actually used. More particularly, it is sufficient that formulas (1) to (5) hold true for the incident angle of 45° with the normal line of the diffuse transmission surface.

Multi-Vision Projector System

[Fourth Embodiment]

A description will proceed to a multi-vision projector system according to a fourth embodiment of the present invention.

Figure 13A:
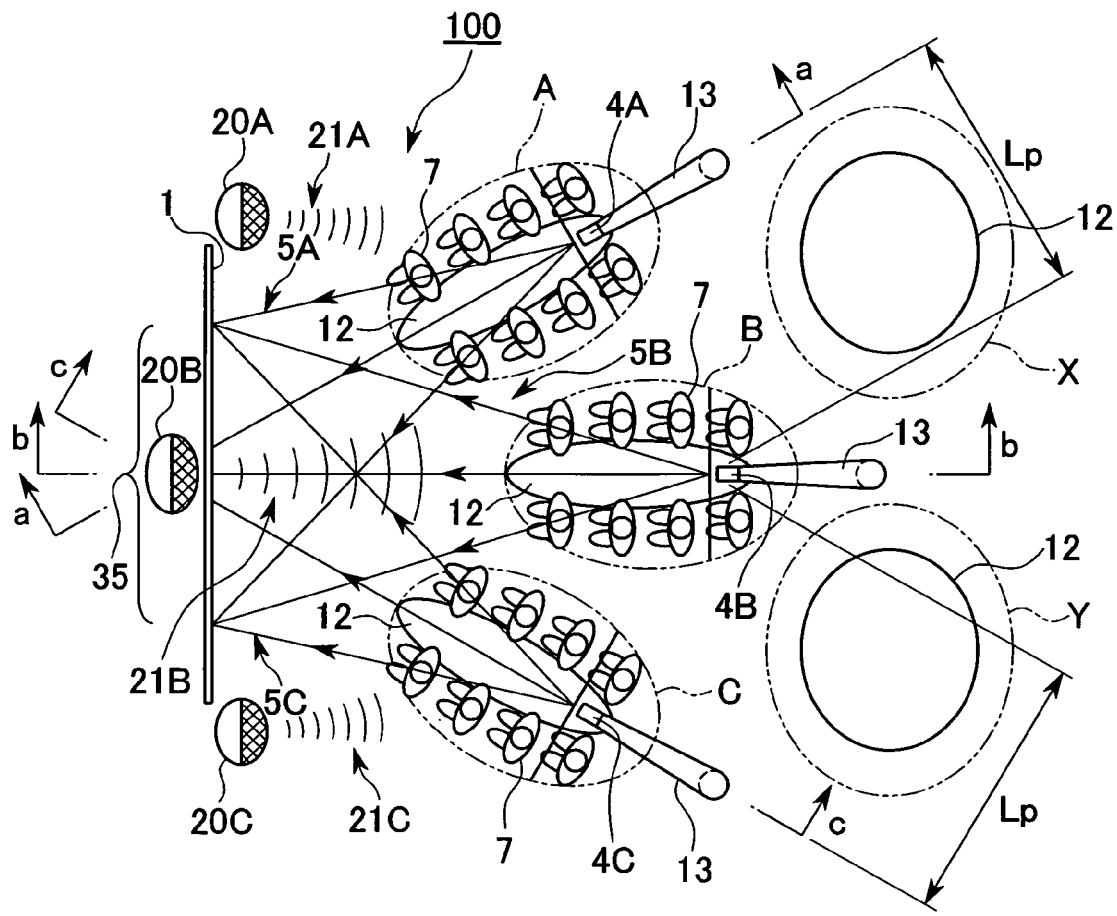
FIGS. 13A and 13B respectively show a schematic plane view and a schematic view of a-a section (b-b section, c-c section) each of which is for describing an outline structure of a multi-vision projector system according to a fourth embodiment of the present invention.
Figure 13B:
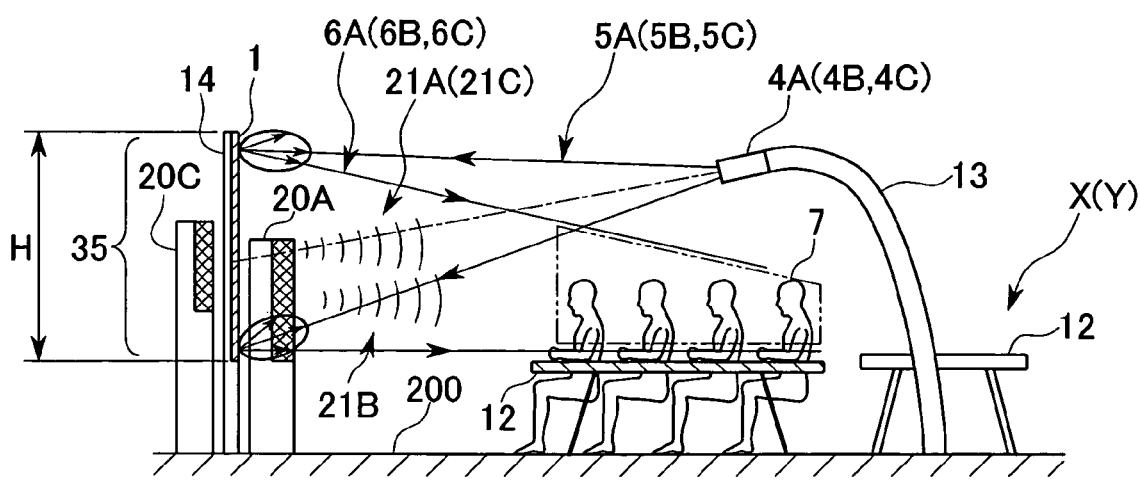

FIG. 13A shows a schematic plane view for describing an outline structure of a multi-vision projector system according to the fourth embodiment of the present invention. FIG. 13B shows a schematic view of a-a section (b-b section, c-c section) of FIG. 13A. Incidentally, it is possible to use the reflection screen illustrated in any one of FIG. 1 and FIG. 10 as a reflection screen used in the multi-vision projector system according to the fourth embodiment of the present invention.

In the projector system (multi-vision projector system) 100 according to the present embodiment, a plurality of images are projected on the reflection screen and the images are capable of being viewed on a plurality of viewing regions which are independent of one another.

As shown in FIG. 13A, the projector system 100 comprises projectors 4A, 4B, and 4C, a flat plane shaped reflection screen (reflection type screen) 1 which is vertically supported on a floor 200 by a screen supporting member 14, and speakers 20A, 20B, and 20C.

In the projectors 4A, 4B, and 4C, the reflection screen 1, and the speakers 20A, 20B, and 20C, each of the projectors 4A, 4B, and 4C has a structure which is basically similar to that of the second embodiment. The reflection screen 1 is a structure which is basically similar to that of each of the first and the second embodiments. Accordingly, a description will be mainly made as regards a structure different from each of the above-mentioned embodiments.

Each of the speakers 20A, 20B, and 20C is connected to a sound source control apparatus which is not illustrated. The speakers 20A, 20B, and 20C are positioned at right side end portion, a central back side, and a left side end portion of the reflection screen 1, respectively. In correspondence to the projectors 4A, 4B, and 4C, sounds 21A, 21B, and 21C are outputted from the speakers 20A, 20B, and 20C to the viewing regions A, B, and C, respectively. In order to simplify the description hereinafter, each of suffixes may be omitted and the speakers 20A, 20B, and 20C and the sounds 21A, 21B, and 21C may be collectively called a speaker 20 and a sound 21, respectively.

It is possible to use a speaker having directivity in which the sound output range is included in any one of the viewing regions A, B, and C, as each of the speakers 20A, 20B, and 20C.

Incidentally, it is unnecessary to make the sound output range correctly correspond to the viewing region for each of the speakers 20, although it is preferable that the sound output range approximately corresponds to the viewing region for each of the speakers 20. In order to listen to the sound 21A in the viewing region A very well, the average sound pressure level of the sound 21A is higher by at least 5 dB than the background noise level of the viewing region A in which the sound 21A is not outputted to the viewing region A. It is preferable that the average sound pressure level of the sound 21A is higher by at least 6 dB than the background noise level of the viewing region A, in order to listen to the sound 21A very well. Furthermore, it is preferable that the average sound pressure level of the sound 21A is higher by at least 10 dB than the background noise level of the viewing region A, in order to listen to only the sound 21A in the viewing region A. Concerning the viewing regions B and C, the sounds 21B and 21C are processed in a manner similar to the sound 21A.

As a result, it is possible to for a viewer 7 in each viewing region to listen to the sound 21 corresponding to each viewing region, even if the sounds 21 leak from the viewing regions.

It is possible to use any known means for realizing the directivity in each speaker 20.

It is possible to adopt the following known art in order to realize high directivity.

More particularly, it is possible to properly use a speaker system comprising a control section such as a digital filter for controlling the sound pressure and the frequency characteristic with respect to each of a plurality of speakers which are positioned in a two-dimensional location (For example, Japanese Patent Application Unexamined Publication No. 1993-41897 will be referred to). The speaker system compounds the sounds each of which has appropriate directivity.

In addition, it is possible to properly use a parametric speaker which carries a sonic wave of audible range on a strong supersonic signal and outputs the sound of audible range in a specific space which exists in an irradiating direction, by a demodulating operation of air (For example, Japanese Patent Application Unexamined Publication No. 2000-3182 will be referred to).

In addition, it is possible to properly adopt a speaker system which outputs sound having high directivity (For example, Japanese Patent Application Unexamined Publication No. 1999-234784 will be referred to). In the speaker system, a plurality of speakers, which output the same sounds, are located in a row. Alternatively, a plurality of speakers are located so that the sonic sound transmitted in a sound tube is outputted from a plurality of locations in a direction perpendicular to the sound tube, by using one sound source. A plurality of sonic waves are outputted to the specific region in phase in order to increase the sound pressure of each sonic wave in the specific region.

Furthermore, it is possible to properly adopt a speaker system which collects the sounds of audible range in the specific region (For example, Japanese Patent Application Unexamined Publication No. 2004-112211 will be referred to). In the speaker system, a plurality of electro-acoustic transducer elements such as ceramic piezoelectric elements are slidably arranged in a sonic irradiation direction and a parametric speaker is constructed by each electro-acoustic transducer element. By controlling the location of each electro-acoustic transducer element, the sounds of audible range that are carried by the supersonic waves are collected in the specific region.

Incidentally, $0°<\theta_1 \leq 30°$ and $0°<\theta_2 \leq 30°$ by adjusting the diffuse magnitude of the diffuse plate 2 in a manner similar to the second embodiment in the present embodiment, with respect to the reflection screen 1. Accordingly, it is possible to reflect the diffused light to the independent regions, when the diffused light enters the reflection screen 1 in at least three directions. In order to reflect the diffused light to a number of independent regions, it is preferable to have a narrow directivity. More specifically, it is preferable to adjust the directivity in which each of $\theta_1$ and $\theta_2$ is not greater than 25°, 20°, or 10°.

In addition, it is preferable to make the directivity of diffused light not greater than 45° in a horizontal direction, in order to form a plurality of viewing regions A, B, and C in the horizontal direction as described in the present embodiment. In other words, it is preferable to satisfy the following Formula.

$$0°<\theta_1+\theta_2 \leq 45° \tag{10}$$

When satisfying Formula (10), it is possible to prevent crosstalk from occurring even though the projected angle of view is large in the projection light 5. As a result, it is easy to make layouts with respect to the projectors and the viewing regions.

Incidentally, it is possible to locate the projectors 4 with distances between the profiles projector 5 and the reflection screen 1 being equal to one another as described in the second embodiment. Furthermore, it is possible to adopt a radial location by approximating the projectors 4A and 4C to the reflection screen 1.

According to the above-mentioned configuration, it is possible to view the image based on the projection light 5A in the viewing region A, inasmuch as the projection light 5A is retro-reflected as the image reflected light 6A and is diffused with a center of incident direction by the reflection screen 1. Similarly, it is possible to view the images based on the projection lights 5B and 5C. When appropriately establishing the distance d between each projector 4 and the reflection screen 1 and the distance $L_p$ between the projectors 4, it is possible to view only the image based on the projection light 5A, 5B, or 5C in the viewing region A, B, or C.

In addition, the sounds 21A, 21B, and 21C each of which has directivity are outputted from the speakers 20A, 20B, and 20C to the viewing regions, respectively. The sound has a high sound pressure level in comparison to the other sounds and the background noise in the corresponding viewing region. As a result, it is possible to listen to the sounds which correspond to the projection lights 5A, 5B, and 5C.

Accordingly, it is possible to effectively use the reflection screen 1 inasmuch as it is possible to independently view the image and the sound which correspond to one viewing region, even if a plurality of projection lights 5 are projected on one reflection screen 1.

In addition, it is impossible to watch the image and listen to the sound in regions such as regions X and Y which are positioned at the rear side of the viewing regions A, B, and C on looking from the reflection screen. As a result, it is possible to effectively use the regions or spaces for other purposes such as space for a conference.

Next, a description will be made as regards a variation of the present embodiment.

The projector system (multi-vision projector system) 101 according to the present variation comprises a reflection screen (reflection type screen) 102 instead of the reflection screen 1 of the second embodiment, in a manner similar to the third embodiment.

In addition, the projector system 101 according to the present variation comprises the speakers 20A and 20C which are similar in structure to the fourth embodiment. The speaker 20A (20C) outputs the sound 21A (21C) corresponding to the image based on the projection light 5C (5A) that is displayed in the viewing region A (C).

The multi-vision projector system according to the present variation has operation and advantages which are basically similar to each of the third and the fourth embodiments.

In addition, the sounds 21A and 21C each of which has directivity are outputted from the speakers 20A and 20C to the viewing regions, respectively. The sound has a high sound pressure level in comparison to the other sounds and the background noise in the corresponding viewing region. As a result, it is possible to listen to the sounds which correspond to the projection lights 5C and 5A.

Accordingly, it is possible to effectively use the reflection screen 102 inasmuch as it is possible to independently view the image and listen to the sound which correspond to one viewing region, even if a plurality of projection lights 5 are projected on one reflection screen 102.

Inasmuch as it is possible to use the reflecting member 102b having the smooth mirror surface as the reflection screen 102, there is an advantage in which it is possible to easily manufacture the reflection screen 102.

[Fifth Embodiment]

Next, a description will proceed to a multi-vision projector system according to a fifth embodiment of the present invention.

Figure 14A:
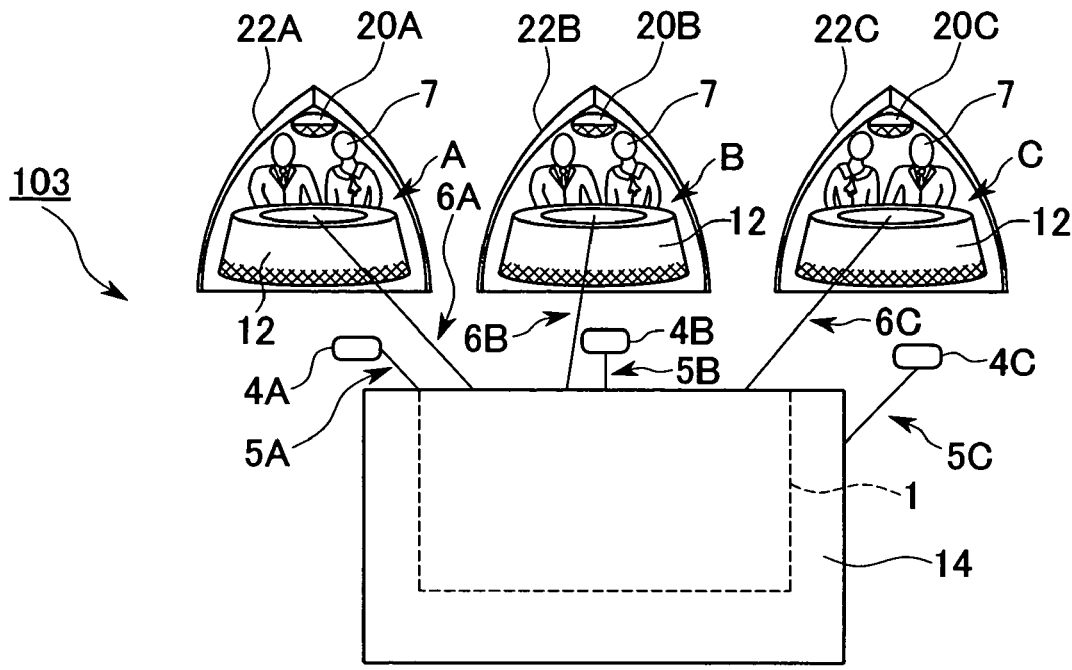
FIG. 14A shows a schematic prospective view for describing an outline structure of a multi-vision projector system according to a fifth embodiment of the present invention.
Figure 14B:
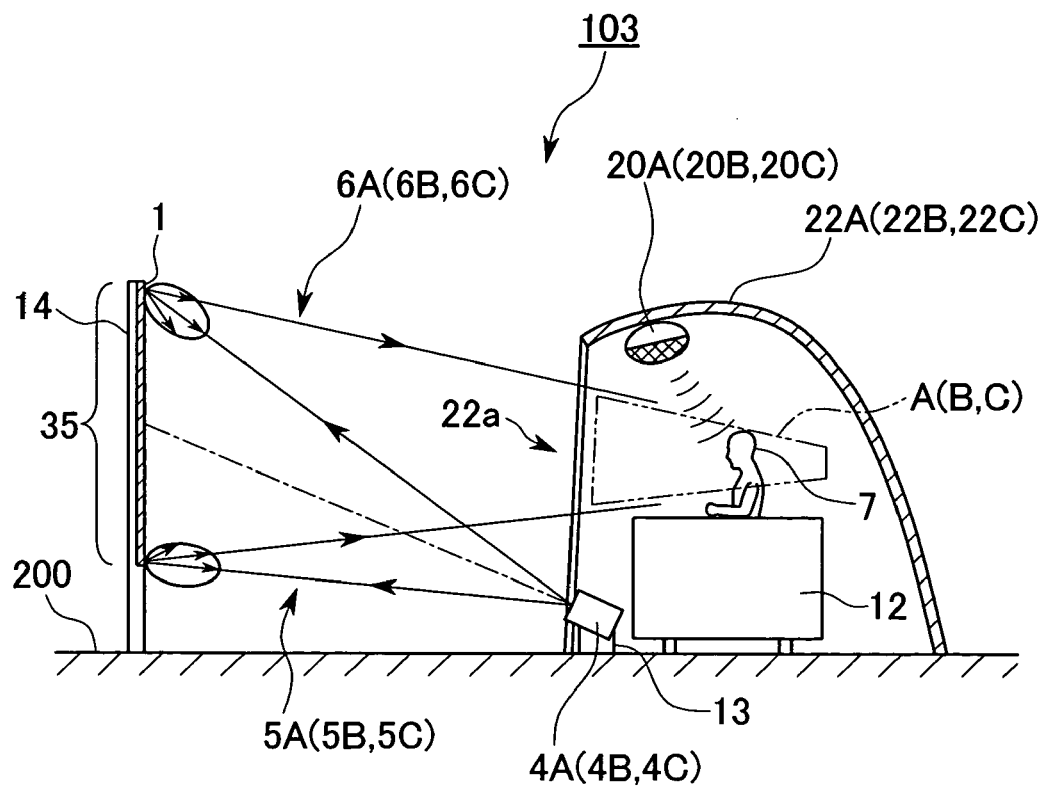
FIG. 14B shows a schematic sectional view for illustrating the outline structure of the multi-vision projector system according to a fifth embodiment of the present invention together with an optical axis of each projection light.

FIG. 14A shows a schematic perspective view for describing an outline structure of the multi-vision projector system according to the fifth embodiment of the present invention. FIG. 14B shows a schematic sectional view for illustrating the outline structure of the multi-vision projector system according to the fifth embodiment of the present invention together with an optical axis of each projection light.

A projector system (multi-vision projector system) 103 according to the present embodiment comprises soundproofing booths 22A, 22B, and 22C in addition to the configuration of the projector system 100 according to the fourth embodiment. The locations are changed with respect to the speakers 20A, 20B, and 20C and the projectors 4A, 4B, and 4C. A description will be mainly made as regards the structure different from the fourth embodiment, hereinafter.

As shown in FIGS. 14A and 14B, the projectors 4A, 4B, and 4C are positioned on the floor 200 which is positioned at a lower side of the reflection screen 1 through a trapezoidal shaped supporting member 13 in a position which is approximately similar to the fourth embodiment in plane view, in the present embodiment. The projectors 4A, 4B, and 4C project the projection lights 5 towards the reflection screen 1 in an upward slanting direction. The projection lights 5A, 5B, and 5C are respectively reflected as the image reflected lights 6A, 6B, and 6C each of which is the diffused light and has directivity, on the common projecting region 35 of the reflection screen 1. The viewing regions A, B, and C, which are independent to one another, are formed at positions which are approximately similar to the fourth embodiment, in the front space in an approximate horizontal direction.

Each of the soundproofing booths 22A, 22B, and 22C (which may be collectively called soundproofing booths 22 hereinafter) is a structure which forms a wall surface portion and a ceiling portion made of a soundproofing material and an acoustic material and which covers the floor 200 except for at an opening which is formed at one end of the horizontal direction. The viewing regions are defined in the soundproofing booths 22A, 22B, and 22C. The image reflected lights 6A, 6B, and 6C, which arrive at the viewing regions, pass through the openings of the soundproofing booths 22A, 22B, and 22C, respectively. In each of the booths 22, each of the wall surface portion and the ceiling portion are formed of an opaque material so that that the outside light has little effect on the viewing region. In other words, it is preferable to shield the outside light by the wall surface portion and the ceiling portion.

A table 12 is located in each of the booths 22 and chairs (not shown) on which an appropriate number of viewers can sit are located around the table 12. Accordingly, the eyes of each viewer are positioned in the viewing region, when each viewer sits around the table 12.

Although it is possible to position the speaker 20A (20B, 20C) at an appropriate position in the soundproofing booth 22A (22B, 22C), the speaker 20A (20B, 20C) is positioned on the ceiling portion in the soundproofing booth 22A (22B, 22C). The speaker 20A (20B, 20C) may be positioned on the table 12 or on the wall surface portion in the soundproofing booth 22A (22B, 22C).

According to the present embodiment, it is possible to listen to the sound while soundproofing against the outside noise and the other sounds supplied to the other viewing regions, inasmuch as each viewing region is covered with the soundproofing booth 22. Therefore, it is possible for a small number of viewers in each viewing region to enjoy the image, the music, and the sound such as a movie or sports for which each of the viewers has a liking, under conditions of being temporarily and spatially independent of one another, in the case of applying the present embodiment to a theatre restaurant. In other words, there is an advantage in which it is possible to enjoy a dinner show or the like in ones spare time.

In addition, it is possible to quietly view the image and listen to the sound even if each of the image and the sound contains confidential material. It is very convenient to have a conference while viewing the image and listening to the sound.

Inasmuch as the speaker 20 is located in the soundproofing booth 22, it is possible to prevent the leakage of sound even if the speaker has high directivity. As a result, there is an advantage in which it is possible to employ a simple configuration having comparatively low directivity. Furthermore, it is possible to employ a speaker having little directivity, on the basis of the location and the volume of the speaker.

[Sixth Embodiment]

Next, a description will proceed to a multi-vision projector system according to a sixth embodiment of the present invention.

Figure 15A:
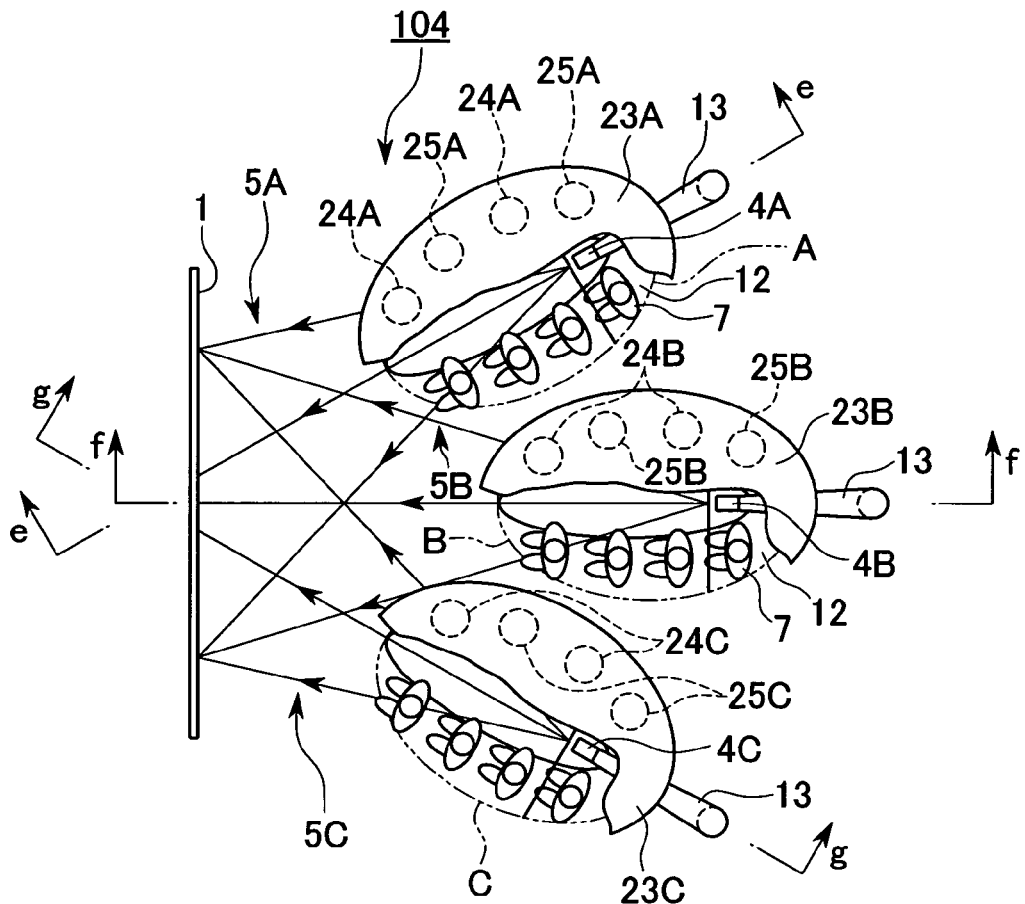
FIGS. 15A and 15B show a schematic plane view and a schematic view of e-e section (f-f section, g-g section) each of which is for describing an outline structure of a multi-vision projector system according to a sixth embodiment of the present invention.
Figure 15B:
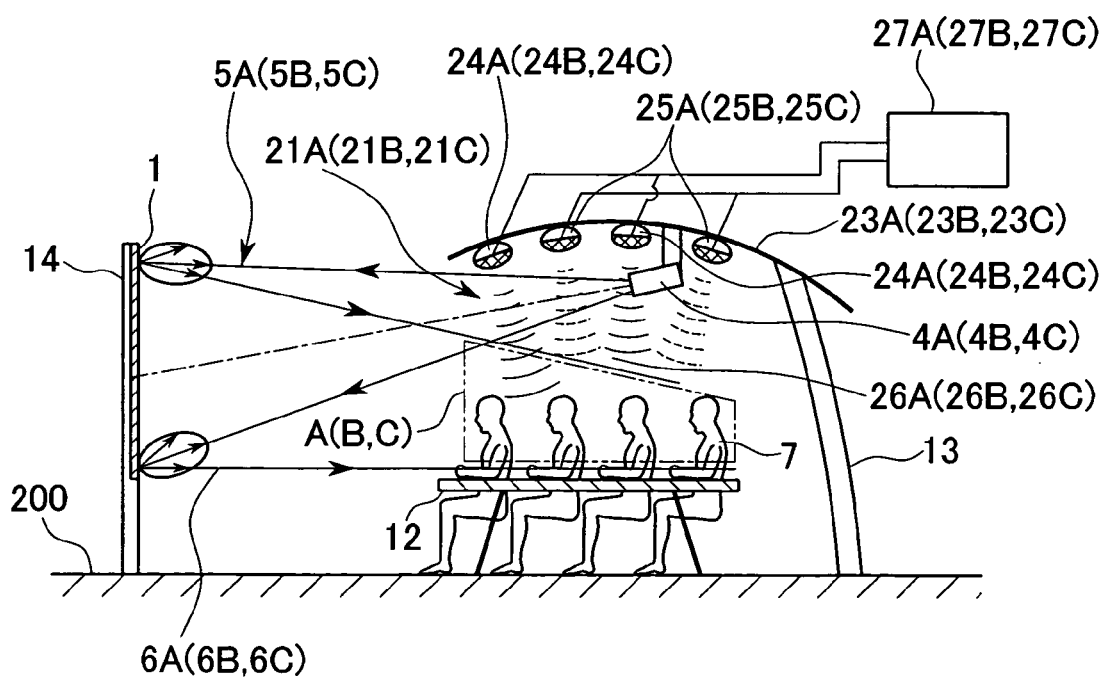

FIG. 15A shows a schematic plane view for describing an outline structure of the multi-vision projector system according to the sixth embodiment of the present invention. FIG. 15B shows a schematic view of e-e section (f-f section, g-g section) of FIG. 15A.

A projector system (multi-vision projector system) 104 according to the present embodiment comprises speakers (sound irradiating speakers) 24A, 24B, and 24C instead of the speakers 20A, 20B, and 20C described in the projector system 100 according to the fourth embodiment. Furthermore, the projector system 104 comprises sound dampening speakers 25A, 25B, and 25C. A description will be mainly made as regards the structure different from the fourth embodiment, hereinafter.

As shown in FIGS. 15A and 15B, the projectors 4A, 4B, and 4C, the reflection screen 1, and the viewing regions A, B, and C are located or formed in a manner similar to the fourth embodiment.

The speaker 24A (24B, 24C) has a structure similar to the speaker 20 and outputs the sound 21A (21B, 21C) having directivity, to the viewing region A (B, C). The speaker 24A (24B, 24C) is connected to a sound source control apparatus 27A (27B, 27C). The speaker 24A (24B, 24C) is supported on the floor 200 by a pole-shaped supporting member 13 and is positioned at a lower surface side of an attaching plate 23A (23B, 23C) which approximately covers the upper side of the viewing region A (B, C). The attaching plate 23A (23B, 23C) positions and holds the speaker 24A (24B, 24C) with respect to the viewing region A (B, C). Furthermore, the attaching plate 23A (23B, 23C) has a function of shielding noise which is applied from the rear side of the speaker 24A (24B, 24C) to the viewing region A (B, C).

Although a plurality of speakers 24A, 24B, and 14C are installed in the example illustrated in FIGS. 15A and 15B, one speaker is installed in the case where the viewing region is narrow.

The sound dampening speaker 25A (25B, 25C) outputs a sound dampening sonic wave 26A (26B, 26C) for dampening the sound such as sound which leaks from another viewing region and which obstructs the view. The sound dampening speaker 25A (25B, 25C) is connected to a sound source control apparatus 27A (27B, 27C). It is preferable for the sound dampening speaker 25A (25B, 25C) to have an appropriate directivity.

The sound dampening speaker 25A (25B, 25C) is positioned and installed at a lower side of the attaching plate 23A (23B, 23C). Although a plurality of sound dampening speakers 25A, 25B, and 25C are installed in the example illustrated in FIGS. 15A and 15B, one sound dampening speaker is installed in the case where the viewing region is narrow.

The sound source control apparatus 27A (27B, 27C) controls the speaker 24A (24B, 24C) to make the speaker 24A (24B, 24C) output the sound 21A (21B, 21C) having an appropriate volume. Furthermore, the sound source control apparatus 27A (27B, 27C) controls the sound dampening speaker 25A (25B, 25C) to make the sound dampening speaker 25A (25B, 25C) output the sound dampening sonic wave 26A (26B, 26C) for dampening the sound except for the sound 21A (21B, 21C) which should be outputted in the viewing region A (B, C).

Inasmuch as the sounds obstructing the viewing region are the sounds which leak from the adjacent viewing regions, in each viewing region, it is possible to use a sonic wave having a phase inverse to the phase of each of the sounds 21A and 21C which leak from the adjacent viewing regions A and B, as the sound dampening sonic wave 26B. The sound pressure level is reduced in each of the sound 21A and 21C by using interference of the sounds 21A and 21C which arrive in the viewing region B.

Similarly, it is possible to use sound dampening sonic waves each of which has a phase inverse to the phase of the sound 21B, in order to dampen the sound 21B.

According to the present embodiment, the sound dampening sonic waves 26A, 26B, and 26C are outputted from the sound dampening speakers 25A, 25B, and 25C by the sound source control apparatuses 27A, 27B, and 27C, respectively. As a result, it is possible to carry out the sound dampening when controlling the sound pressure level and generating an optimum interference wave. More specifically, it is possible to carry out the sound dampening control while monitoring the sound which should be dampened when installing a monitoring microphone in each of the viewing regions. Furthermore, it is possible to control the sound pressure level of the sound dampening sonic wave in accordance with the magnitude of sound leaking to a specific viewing region which is expected on the basis of the alignment of the viewing regions. In addition, it is possible to select the sound dampening level from a plurality of levels such as −5 dB, −6 dB, or −10 dB, in a manner similar to the fourth embodiment, according to need.

As described above, it is possible to view the image and listen to the sound without interference from the sounds which leak from the adjacent viewing regions, even if the viewing region is covered with the sound dampening booth, inasmuch as the sounds leaking from the adjacent viewing regions are dampened in each viewing region. Accordingly, it is possible to carry out the viewing in an open atmosphere without installing equipment such as the sound dampening booth.

Inasmuch as a plurality of sound dampening speakers 25B are installed in the present embodiment, one of the sound dampening speakers 25B may output the sonic wave for dampening the sound 21A and another one of the sound dampening speakers 25B may output the sonic wave for dampening the sound 21C.

In addition, it is possible to dampen all of the sounds except for the sound 21 (for example, sound 21B) corresponding to each viewing region in addition to dampening the sounds which leak from the adjacent viewing regions. More particularly, a microphone (not shown) picks up the sound in the viewing region B that should be dampened. Each of the sound source control apparatuses 27A, 27B, and 27C carries out signal processing in which a sound signal having an inverse phase is produced from a sound signal which is obtained by subtracting the component of sound 21B from the sound picked up by the microphone. It is possible to generate the sound dampening sonic waves 26A, 26B, and 26C on the basis of the sound signals each of which has the inverse phase.

As described above, the sound adjusted to the inverse phase has at least sound 21A and 21C and may have a noise component other than the sound 21A and 21C.

In this case, it is possible to obtain a high sound dampening effect when a plurality of sound dampening speakers each of which has a high directivity are installed in accordance with the size of the viewing region and when the sound dampening is carried out in each of small areas into which the viewing region is divided.

[Seventh Embodiment]

Next, a description will proceed to a multi-vision projector system according to a seventh embodiment of the present invention.

Figure 16A:
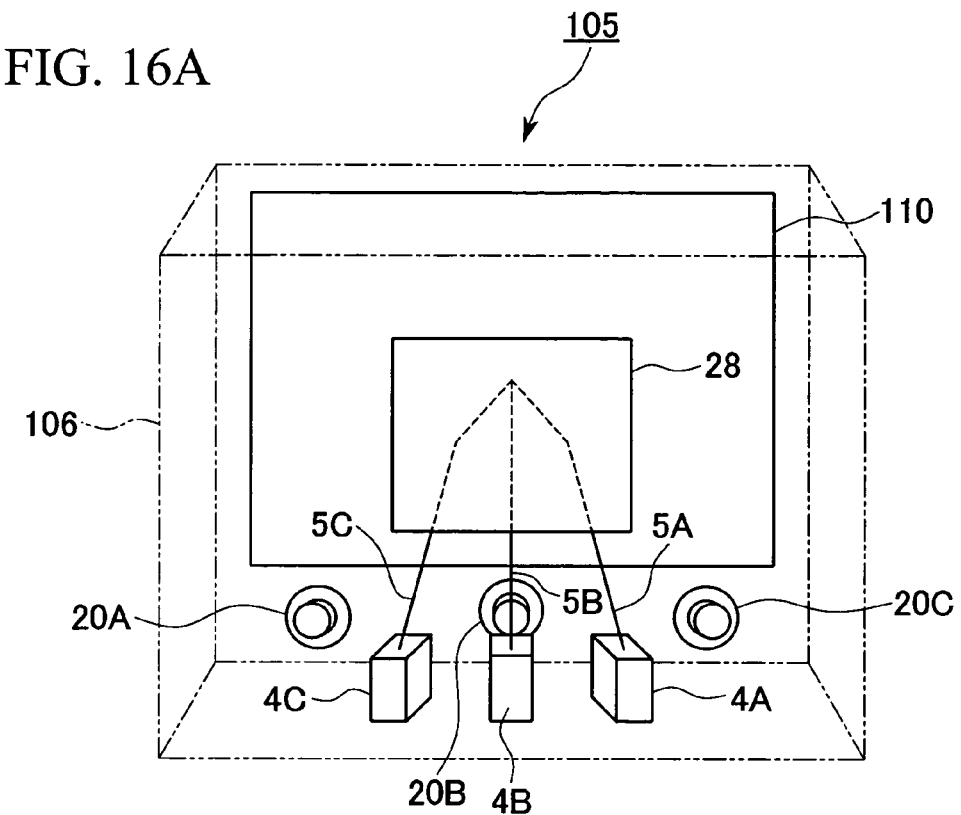
FIG. 16A shows a schematic perspective view from a back side for describing an outline structure of main components of a multi-vision projector system according to a seventh embodiment of the present invention.
Figure 16B:
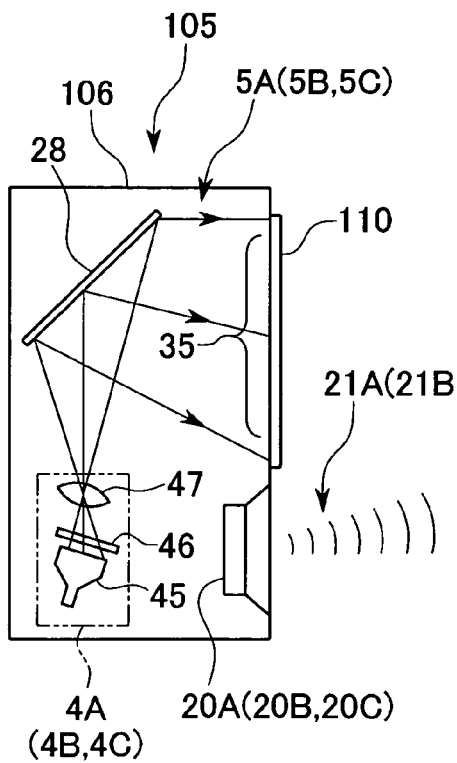
FIG. 16B shows a schematic sectional view for illustrating the outline structure of the multi-vision projector system according to a fifth embodiment of the present invention together with an optical axis of each projection light.
Figure 16C:
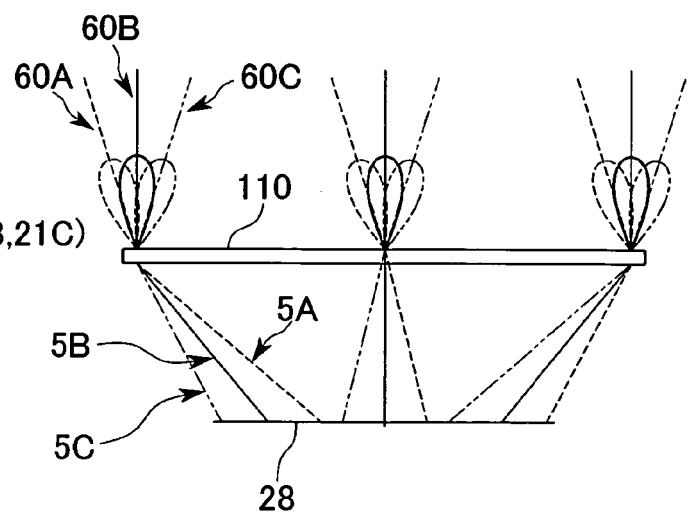
FIG. 16C shows a schematic plane view for illustrating an optical path.

FIG. 16A shows a schematic perspective view from a back side for describing an outline structure of main components of the multi-vision projector system according to the seventh embodiment of the present invention. FIG. 16B shows a schematic sectional view for illustrating an optical axis of each projection light in FIG. 16A. FIG. 16C shows a schematic plane view for illustrating an optical path in FIG. 16B.

A projector system (multi-vision projector system) 105 according to the present embodiment is a rear projector system which comprises a rear projecting screen (transparent type screen) 110, instead of the reflection screen 1 of the projector system described in the fourth embodiment. As shown in FIGS. 16A and 16B, the projectors 4A, 4B, and 4C and the speakers 20A, 20B, and 20C are positioned at a rear side of the rear projecting screen 110. The projectors 4A, 4B, and 4C and the speakers 20A, 20B, and 20C are installed in a housing and constitute a projector apparatus 106.

Inasmuch as the front region of the screen has a configuration which is approximately similar to the front region of the screen illustrated in each of FIGS. 13A and 13B, a description and illustration will be omitted. A description will be mainly made as regards the structure different from the fourth embodiment, hereinafter.

The rear projecting screen 110 is a screen having light permeability that has a diffuse transmission surface which diffuses and transmits the image projected on the rear surface, in a predetermined direction which is a direction along an optical axis of the incident light. For example, it is possible to use the structure similar to the diffuse plate 2. In the present embodiment, a regular diffusive pattern is formed on the rear projecting screen 110, in order to obtain the diffused light. The angle range becomes $\theta_1 + \theta_2 = 20°$ in the horizontal direction of diffused light by appropriately adjusting the pitches of patterns.

The rear projecting screen 100 is positioned at a front side (left side in FIG. 16B) of the projector apparatus 106 in an approximately vertical direction.

In FIGS. 16A and 16C, the projectors 4A, 4B, and 4C are positioned in an order of projectors 4C, 4B, and 4A from a left side in the drawing (referring to FIG. 16A) so as to form the viewing regions A, B, and C from the left side in the drawing. As shown in FIG. 16B, the projectors 4A, 4B, and 4C are positioned at a lower side of the rear projecting screen 110 and are capable of projecting the projection lights 5 in a direction which is slightly slanting towards upper side of the vertical direction.

Incidentally, the projection lights are projected on the common projecting region 35 in the example being illustrated in the present embodiment.

In FIG. 16B, the reference numerals 45, 46, and 47 represent a light source, a spatial modulating element, and a projecting lens, respectively.

A turning mirror 28 is positioned above each of the projectors 4 while being inclined towards a direction of the rear projecting screen 110. The turning mirror 28 is for turning the projection light 5 to make the projection light 5 enter the rear projecting screen 110.

The speakers 20A, 20B, and 20C in the projector apparatus 106 are positioned below the rear projecting screen 110, in an order illustrated in FIG. 16A from the left side. The speakers 20A, 20B, and 20C are directed to the viewing regions A, B, and C. In other words, the central axis of sound irradiation is directed to the viewing region in each of the speakers 20A, 20B, and 20C. Alternatively, the center of directivity is directed to the viewing region by appropriately adjusting the directivity in each of the speakers 20A, 20B, and 20C.

According to the projector system 105 of the present embodiment, the projection lights 5 projected by the projectors 4 are turned by the turning mirrors 28, and the images based on the projection lights 5 are projected on the rear projecting screen 110. As shown in FIG. 16C, the images are transmitted through the rear projecting screen 110 with diffusion along the incident directions, and the image diffused lights 60A, 60B, and 60C are formed each of which has directivity with the corresponding viewing region.

Although there is difference depending on whether the screen is the reflection type screen or the transparent type screen, it is possible to view the image based on each of the projection lights 5 in only the corresponding viewing region in a manner similar to the fourth embodiment.

On the other hand, it is possible to listen to the sounds 21A, 21B, and 21C corresponding to the projection lights 5, in the viewing regions, according to the speakers 20A, 20B, and 20C, respectively.

As described above, it is possible to provide operation and effects which are similar to the fourth embodiment, in the rear projector system using the transparent type screen.

As described above, there is an advantage in which it is possible to form a large space in the front region of the screen inasmuch as the projectors 5 are positioned at the rear side of the screen according to the rear projecting system.

In addition, the present embodiment is varied to a configuration in which it is possible to make each of the projectors 4 move with respect to the rear projecting screen 110 within the projector apparatus 106. More specifically, the present embodiment is varied to a configuration in which it is possible to make each of the projectors 4 move towards a direction which is approximately parallel to the rear projecting screen 110. Alternatively, the present embodiment is varied to a configuration in which the incident directions are changed with respect to the rear projecting screen 110 by moving the projectors 4. In other words, each of the projectors 4 is mounted on an actuator or moving stage whose travel distance or angle is variable, in order to appropriately control the movement of each projector.

In this case, it is possible to vary the range or the size of the common projecting region 35 in the rear projecting screen 110 on which the projection lights 5 are overlapped.

According to the above-mentioned configuration, it is possible to move the space in which the viewing region is formed, by a simple operation, inasmuch as the projector 4A is positioned in the projector apparatus 106 in a movable state. Accordingly, there is an advantage in which it is possible to vary the layout of the viewing regions in accordance with purpose of use or the number of viewers.

In the present embodiment, the other advantages and variations are basically similar to those of each of the second and the third embodiments.

Although the rear projector system has two or three projectors in the above description, it is possible for the rear projector system to have a plurality of projectors when the viewing regions are not overlapped.

In the case where the rear projector system has one projector and one speaker corresponding to the projector, a problem does not exist in which the image and the sound are overlapped on the image and the sound of another viewing region in any configuration. However, it is easy to establish the viewing region without using booths or partitions, in order to hold a conference in which secrecy is required, inasmuch as it is possible to definitely establish the viewing region. In addition, there is an advantage in which it is possible to effectively utilize the other spaces for uses other than viewing purposes.

In addition, sounds may be outputted which are different from one another in the viewing regions, using the same image in each of the viewing regions. More particularly, it is possible to construct a movie theater having a single screen in which the same foreign movie is played in one of the viewing regions with subtitles, and is played in another one of the viewing regions in a different language.

In addition, it is possible to appropriately combine the arts described in the embodiments and variations where feasible, within the sprit and scope of the present invention. For example, it is possible to appropriately vary the presence or absence of the soundproofing booth and the location of speakers on replacing the front projector system with the rear projector system.

The projector system of the present invention is applicable to various types of display systems.

While preferred embodiments of the invention have been described and illustrated above, it should be understood that these are exemplary of the invention and are not to be considered as limiting. Additions, omissions, substitutions, and other modifications can be made without departing from the sprit or scope of the present invention. Accordingly, the invention is not be considered as being limited by the foregoing description, and is only limited by the scope of the appended claims.

What is claimed is:

1. A reflection type projecting screen, for reflecting projection light from a light source, comprising:
    a diffuse transmission surface for converting at least transmission light into diffused light; and
    a corner cube group positioned at a back surface side of said diffuse transmission surface when looking from said light source, said corner cube group reflecting said projection light passing through said diffused transmission light towards said diffuse transmission surface;
    wherein the following Formulas are satisfied when inputting light of wavelengths $\lambda_B$=485 nm, $\lambda_G$=550 nm, and $\lambda_R$=650 nm $$0.8 \leq (R_B/I_B)/(R_G/I_G) \leq 1.25 \quad (1)$$

$$0.8 \leq (R_R/I_R)/(R_G/I_G) \leq 1.25 \quad (2)$$

where $I_B$, $I_G$, and $I_R$ represent the incident light intensities of wavelengths of $\lambda_B$, $\lambda_G$, and $\lambda_R$, respectively, and $R_B$, $R_G$, and $R_R$ represent the output light intensities of wavelengths of $\lambda_B$, $\lambda_G$, and $\lambda_R$, respectively.

2. A reflection type projecting screen as claimed in claim 1, wherein said corner cube group is composed of a prism group.

3. A reflection type projecting screen as claimed in claim 2, wherein an incident surface of said prism group serves as said diffuse transmission surface.

4. A reflection type projecting screen as claimed in claim 1, wherein:
    said reflection type projecting screen comprises a light diffuse transmission element whose one surface has said diffuse transmission surface and whose opposite surface has a smooth flat plane surface or a smooth curved surface; and
    said opposite surface of the light diffuse transmission element is directed towards said light source.

5. A reflection type projecting screen as claimed in claim 1, wherein said corner cube group is formed by joining a plurality of corner cube units to one another, said corner cube units being composed of one corner cube or a plurality of corner cubes which are integral with one another.

6. A reflection type projecting screen as claimed in claim 1, wherein a light shielding treatment is given to ridge line portions in which the corner cubes of said corner cube group are adjacent to one another.

7. A reflection type projecting screen, for reflecting projection light from a light source, comprising:
    a diffuse transmission surface for converting at least transmission light into diffused light; and
    a corner cube group positioned at a back surface side of said diffuse transmission surface when looking from said light source, said corner cube group reflecting said projection light passing through said diffused transmission light towards said diffuse transmission surface;
    wherein the following Formulas are satisfied when inputting light of wavelengths $\lambda_B$=485 nm, $\lambda_G$=550 nm, and $\lambda_R$=650 nm, to said diffuse transmission surface $$0.5 \leq R_B/I_B \leq 1 \quad (3)$$

$$0.5 \leq R_G/I_G \leq 1 \quad (4)$$

$$0.5 \leq R_R/I_R \leq 1 \quad (5)$$

where $I_B$, $I_G$, and $I_R$ represent the incident light intensities of wavelengths of $\lambda_B$, $\lambda_G$, and $\lambda_R$, respectively, and $R_B$, $R_G$, and $R_R$ represent the output light intensities of wavelengths of $\lambda_B$, $\lambda_G$, and $\lambda_R$, respectively.

8. A reflection type projecting screen, for reflecting projection light from a light source, comprising:
    a diffuse transmission surface for converting at least transmission light into diffused light; and
    a corner cube group positioned at a back surface side of said diffuse transmission surface when looking from said light source, said corner cube group reflecting said projection light passing through said diffused transmission light towards said diffuse transmission surface;
    wherein said diffuse transmission surface has a concave and convex surface which is smaller than a pitch between vertexes of the corner cubes in said corner cube group.

9. A front projector system, comprising:
    a projector for projecting an image; and
    a reflection screen which reflects said image as diffused light having directivity in at least one predetermined direction, in accordance with an incident direction of the image;
    wherein the following Formula is satisfied when said projector is located at a position which is apart by a distance d from said reflection screen $$d \leq 0.5 \times L/\tan 25°$$

where L represents a diagonal length in the image which is projected from said projector to said reflection screen.

10. A front projector system as claimed in claim 9, wherein the incident direction of said image with respect to said reflection screen is included in a range of reflection directions of said diffused light.

11. A front projector system as claimed in claim 9, wherein an angle range corresponding to said predetermined direction is not greater than 30° when said directivity is given by said angle range in which said diffused light is distributed.

12. A front projector system as claimed in claim 9, wherein said predetermined direction is a direction which forms approximately 180° with respect to the incident direction in which said image enters said reflection screen.

13. A front projector system as claimed in claim 9, wherein:
    said front projector system comprises a plurality of projectors, the images projected from said projectors being projected on said reflection screen from directions different from one another with respect to said reflection screen.

14. A front projector system as claimed in claim 13, wherein at least part of said images projected from said projectors are projected on a common region of said reflection screen.

15. A front projector system as claimed in claim 9, wherein said projector is located at an upper side or a lower side with respect to a front region of said reflection screen.

16. A front projector system as claimed in claim 9, wherein said reflection screen has a corner cube array.

* * * * *